(12) United States Patent
Liu et al.

(10) Patent No.: US 12,450,443 B2
(45) Date of Patent: Oct. 21, 2025

(54) SESSION MESSAGE GENERATION METHOD, APPARATUS AND STORAGE MEDIUM AND DEVICE

(71) Applicant: TENCENT TECHNOLOGY (SHENZHEN) COMPANY LIMITED, Guangdong (CN)

(72) Inventors: Yafei Liu, Shenzhen (CN); Ruihui Zhao, Shenzhen (CN); Xi Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 471 days.

(21) Appl. No.: 17/983,556

(22) Filed: Nov. 9, 2022

(65) Prior Publication Data
US 2023/0081741 A1 Mar. 16, 2023

Related U.S. Application Data

(63) Continuation of application No. PCT/CN2021/124825, filed on Oct. 20, 2021.

(30) Foreign Application Priority Data

Nov. 18, 2020 (CN) .......................... 202011299005.0

(51) Int. Cl.
*G06F 40/35* (2020.01)
*G06F 16/3329* (2025.01)
(Continued)

(52) U.S. Cl.
CPC .......... *G06F 40/35* (2020.01); *G06F 16/3329* (2019.01); *G06F 40/126* (2020.01); *G06F 40/279* (2020.01); *G06N 20/00* (2019.01)

(58) Field of Classification Search
CPC .... G06F 40/35; G06F 16/3329; G06F 40/126; G06F 40/279; G06N 20/00; G06N 5/025; G06N 3/044
See application file for complete search history.

(56) References Cited

U.S. PATENT DOCUMENTS

2002/0178019 A1* 11/2002 Anderson ............... H04W 4/12
709/200
2018/0107930 A1* 4/2018 Aggarwal .............. G06Q 10/10
(Continued)

FOREIGN PATENT DOCUMENTS

CN 110704703 A 1/2020
CN 110851575 A 2/2020
(Continued)

OTHER PUBLICATIONS

International Search Report of PCT/CN2021/124825 dated Jan. 26, 2022 [PCT/ISA/210].
(Continued)

*Primary Examiner* — Fariba Sirjani
(74) *Attorney, Agent, or Firm* — Sughrue Mion, PLLC

(57) ABSTRACT

A session message generation method, apparatus and device and storage medium. The method includes: acquiring historical session messages between a session robot and a target user in the current man-machine session process and a session reference information set related to a session topic when it is detected that there is a trigger event in the current man-machine session process; determining a target session role of the session robot at the time of performing a message input operation according to the historical session messages and the session reference information set; and generating a target session message corresponding to the target session (Continued)

role based on the historical session messages and the session reference information set, and outputting the target session message.

18 Claims, 8 Drawing Sheets

(51) Int. Cl.
    *G06F 40/126*     (2020.01)
    *G06F 40/279*     (2020.01)
    *G06N 20/00*     (2019.01)

(56) References Cited

U.S. PATENT DOCUMENTS

| | | | | |
|---|---|---|---|---|
| 2019/0378024 | A1* | 12/2019 | Singh | G06N 5/043 |
| 2019/0379615 | A1* | 12/2019 | Karp | H04L 51/02 |
| 2020/0227043 | A1 | 7/2020 | Badr et al. | |
| 2021/0103811 | A1* | 4/2021 | Kim | G10L 15/16 |
| 2021/0150151 | A1* | 5/2021 | Xu | G06N 3/044 |
| 2022/0012547 | A1* | 1/2022 | Zhu | G06F 18/2411 |
| 2023/0325884 | A1* | 10/2023 | Liu | G06Q 30/0207 |
| | | | | 705/14.66 |

FOREIGN PATENT DOCUMENTS

| | | |
|---|---|---|
| CN | 106649704 B | 4/2020 |
| CN | 112417117 A | 2/2021 |

OTHER PUBLICATIONS

Written Opinion of PCT/CN2021/124825 dated Jan. 26, 2022 [PCT/ISA/210].

* cited by examiner

SESSION MESSAGE GENERATION METHOD, APPARATUS AND STORAGE MEDIUM AND DEVICE

CROSS-REFERENCE TO RELATED APPLICATION(S)

This application is a continuation application of International Application No. PCT/CN2021/124825, filed on Oct. 20, 2021, which claims priority to Chinese Patent Application No. 202011299005.0, filed with the China National Intellectual Property Administration on Nov. 18, 2020, the disclosures of which are incorporated by reference in their entireties.

FIELD

The disclosure relates to the field of artificial intelligence, in particular to a human-machine dialogue technique.

BACKGROUND

Man-machine conversation refers to enabling the machine to understand and use natural language to achieve man-machine interaction. Automatic man-machine conversation has been a core research topic in the fields of natural language processing and artificial intelligence, and many researchers have developed various man-machine conversational systems for a long time.

Currently, conversation robots in most human-machine session systems are set to passively answer questions raised by users. This type of dialogic chat mechanism is relatively simple and tends to consume users' interest quickly, making it difficult to ensure the persistence of man-machine conversations. Therefore, in the field of natural language processing, how to increase the interest of man-machine conversation and more effectively attract users to participate in man-machine dialogue has become a hot topic in the current research.

SUMMARY

Some embodiments of the disclosure may provide a method and apparatus and device and storage medium for generating a session message, which makes a man-machine session more similar to a session between real users, enriches the form of the man-machine session and improves the interest of the man-machine session.

Some embodiments may provide a session message generation method, performed by a computer device, the method including: acquiring historical session messages between a session robot and a target user in a current man-machine session process and a session reference information set related to a session topic when it is detected that there is a trigger event in the current man-machine session process, the trigger event being used for triggering the session robot to perform a message input operation in the current man-machine session process; determining a target session role of the session robot at the time of performing the message input operation according to the historical session messages and the session reference information set, the target session role being an active session role or a passive session role; and generating a target session message corresponding to the target session role based on the historical session messages and the session reference information set, and outputting the target session message.

Some embodiments may provide a session message generation apparatus, including: an acquiring unit, configured to acquire historical session messages between a session robot and a target user in a current man-machine session process and a session reference information set related to a session topic when it is detected that there is a trigger event in the current man-machine session process, the trigger event being used for triggering the session robot to perform a message input operation in the current man-machine session process; and a processing unit, configured to determine a target session role of the session robot at the time of performing the message input operation according to the historical session messages and the session reference information set, the target session role being an active session role or a passive session role; and the processing unit being configured to generate a target session message corresponding to the target session role based on the historical session messages and the session reference information set, and to output the target session message.

Some embodiments may provide a computer device, including: a processor, suitable for implementing one or more instructions; and a computer storage medium, storing one or more instructions, the one or more instructions being suitable to be loaded by the processor to perform the session message generation method described above.

Some embodiments may provide a non-transitory computer storage medium, the computer storage medium storing computer program instructions, the computer program instructions, when executed by a processor, being configured to perform the foregoing session message generation method.

Some embodiments may provide a computer program product or a computer program, the computer program product or the computer program including computer instructions, the computer instructions being stored in a computer-readable storage medium; and the processor of the session message generation device reading the computer instructions from the computer storage medium to perform the above session message generation method.

In the current man-machine session process of the session robot and the target user, when it is detected that there is a trigger event for triggering the session robot to perform a message input operation in the current man-machine session process, the historical session message set between the session robot and the target user in the current man-machine session process and the session reference information set related to the topic of the current man-machine session are acquired; further, a target session role of the session robot at the time of performing the message input operation is determined according to the historical session message set and the session reference information set, and the target session role may be an active session role or a passive session role; and then, based on the historical session message set and the session reference information set, a target session message corresponding to the target session role is generated and outputted. As can be seen, in the current man-machine session process, the session message that matches the role of the session robot may be generated. Compared with the session form in which the session robot blindly and passively replies to the user's message in the related art, the form of man-machine session is enriched, the precision of man-machine interaction is improved, and the user's interest in session is also improved advantageously.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
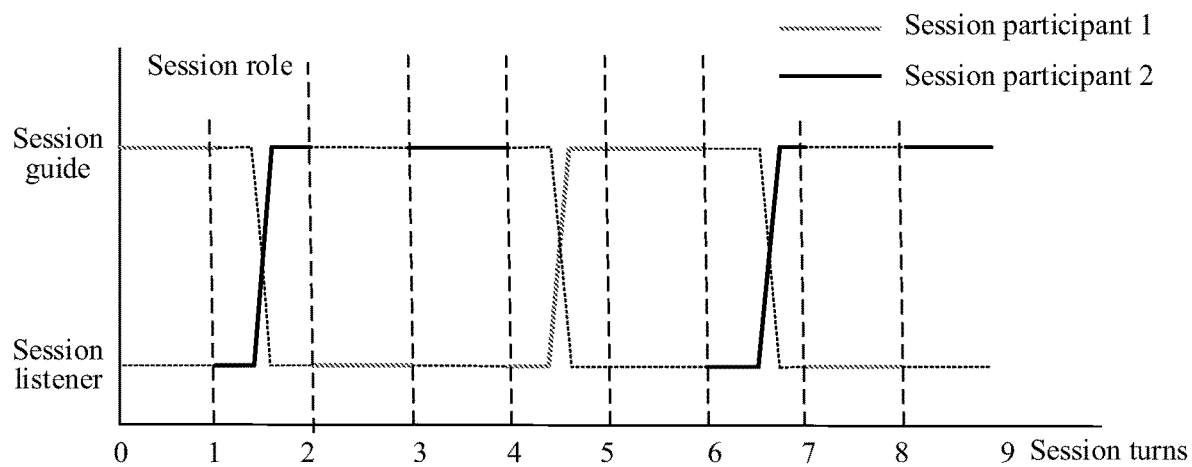
FIG. 1 is a schematic diagram of session role conversion of session participants in a session according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict A passive dialogue system is a relatively common man-machine session system at present. Passive dialogue means that the session role of the session robot in the man-machine session process is always a passive session role. In the passive dialogue system, the session robot can only passively answer the questions raised by users. It can be seen that the chat mechanism under the passive dialogue system is relatively simple, and the user who has a session with the session robot under the passive dialogue system is likely to lose interest in session quickly.

In order to solve this problem, the embodiments of the disclosure use some external knowledge (which may be hereinafter abbreviated as session reference information) to give the session robot the ability to actively express. Such a dialogue system that gives the session robot the ability to actively express based on external knowledge can be called an active dialogue system. In the active dialogue system, the session role of the session robot in the man-machine session process is always the active session role. Under the active dialogue system, the session robot actively guides the session according to the external knowledge. That is, it actively transmits the information included in the external knowledge to the user. In practice, it is found that although the active dialogue system can solve the problem that the session robot has been passively replying to the user, it has created a new problem: since the external knowledge usually includes more information, in order to transmit the information in the external knowledge to the user, the session robot tends to ignore session messages fed back by the user and continues to express itself. Such a phenomenon can also be understood as the session robot talking to itself. This will lead to a decrease in the user's engagement in the man-machine session process, and a better man-machine session effect cannot be achieved. In other words, one reason that causes the session robot to ignore session messages fed by the user in an active dialogue system is that there is too much external knowledge that the session robot needs to transmit to the user.

In a dialogue system, the more external knowledge a session robot needs to transmit to the user, the more active the session robot is in the session, and the more likely it is to become a session guide (the session guide plays an active session role in the session process), that is, the amount of external knowledge to be conveyed is positively correlated with how active the session role is in the session.

It is experimentally observed that in the session process, when one of the session participants leads the session topic (the session role of this session participant in the session can be called the active session role), it needs to transmit more information and needs to master more knowledge; and the other session participant in the session, as a listener (the session role of this participant in the session can be called the passive session role), does not need to master too much knowledge, but only basic dialogue skills. In other words, different session roles have different degrees of mastery of knowledge in the process of one session.

In addition, through the study of the session scenario, it is found that the session role of a session participant in the session process can change with the progress of the session. FIG. 1 is a diagram of session role conversion of two users in a session process according to some embodiments. As shown in FIG. 1, session participant 1 and session participant 2 take turns to act as session guides throughout the different session rounds to keep the session going. One session round can be understood as two session participants each sending several session messages to discuss the same content.

Based on the above, some embodiments propose a session message generation scheme. Specifically, in the current man-machine session process, when it is detected that there is a trigger event used for triggering a session robot to perform a message input operation, the session role of the session robot at the time of performing the message input operation is determined according to historical session messages in the current man-machine session process and a reference session information set, and then according to the historical session messages and the reference session information set, a session message that matches the session role is generated. In this way, in the man-machine session process, the session role of the session robot is determined in real time, and based on the session role, the session role conveys a corresponding message to the user, so that it not only conveys information to the user, but also ensures the user's engagement in the session process and improves the man-machine interaction experience.

Figure 2:
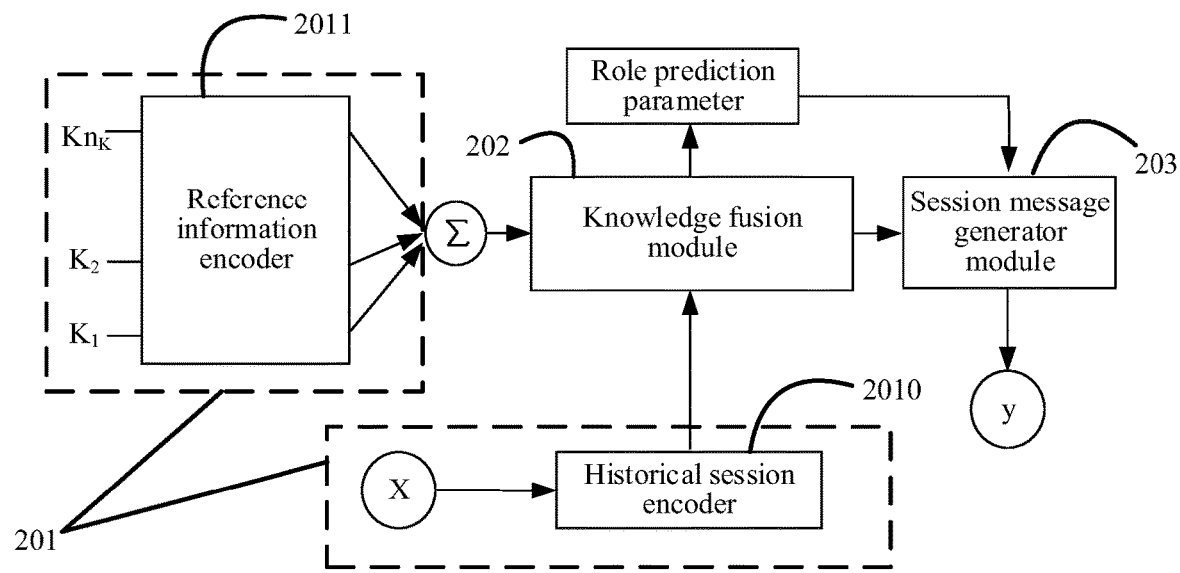
FIG. 2 is a schematic structural diagram of a session processing model according to some embodiments.

Based on the above session message generation scheme, some embodiments provides a session processing model (it may also be referred to as Initiative-Imitate model). The above session message generation scheme may be executed by a computer device calling the session processing model. FIG. 2 is a schematic structural diagram of an image processing model according to some embodiments. The session processing model shown in FIG. 2 is composed of three parts, i.e., an encoder 201, a knowledge fusion module 202, and a session message generator module 203.

In an embodiment, the encoder 201 may include a historical session encoder 2010 and a reference knowledge encoder 2011. The historical session encoder 2010 and the reference knowledge encoder 2011 may have the same structure, but do not share parameters. The historical session encoder 2010 plays a role in encoding variable-length historical session messages and converting them into fixed-length vector representations. The reference knowledge encoder 2011 plays a role in encoding each of the variable-length session messages in the session reference information set and converting it into a corresponding fixed-length vector representation. Specifically, after the historical session messages are encoded by the historical session encoder 2010, a first encoding result will be obtained; and after each of the session reference messages is encoded by the reference knowledge encoder 2011, a second encoding result corresponding to each of the session reference messages will be obtained.

In some embodiments, the knowledge fusion module 202 is respectively connected with the historical session encoder 2010 and the reference knowledge encoder 2011. The knowledge fusion module 202 is configured to conduct information fusion of the historical session messages and the session reference information set according to the first encoding result and the second encoding result corresponding to each of the session reference messages, and to determine a role prediction parameter.

In some embodiments, the knowledge fusion module 202 is also connected with the session message generator module 203. The session message generator 203 is configured to determine a target session role of the session robot at the time of performing a message input operation according to the role prediction parameter, and further to generate a target session message corresponding to the target session role according to the target session role and the result of fusing the historical session messages and the session reference information set by the knowledge fusion module 202, and then output the target session message.

In the current man-machine session process, by adopting the above session processing model to generate the target session message corresponding to the session robot in real time, the expression reply more in line with the role state can be realized, the user's engagement in the man-machine session process is increased, and the intelligence of man-machine session is improved.

In order to test the advantages of the above session processing model in man-machine session, the embodiments compare the above session processing model with several other common man-machine session models. For example, the session processing model in the embodiments is compared with seq2seq, seq2seqattn, CopyNet, Generative-base, DeepCopy and several other models common in man-machine session.

Automatic indicators for comparison may include F1, BELU-1, BELU-2, Distinct-1, and Distinct-2. The comparison results can be shown in Table 1 below.

TABLE 1

Comparison of the session processing model with other models

| Model Name | F1 | BELU-1 | BELU-2 | Distinct-1 | Distinct-2 |
| --- | --- | --- | --- | --- | --- |
| seq2seq | 37.60 | 0.265 | 0.265 | 0.265 | 0.189 |
| seq2seq$_{attn}$ | 38.26 | 0.264 | 0.173 | 0.085 | 0.192 |
| CopyNet | 39.01 | 0.229 | 0.154 | 0.132 | 0.307 |
| Generative-base | 35.98 | 0.341 | 0.189 | 0.062 | 0.178 |
| DeepCopy | 43.31 | 0.308 | 0.213 | 0.129 | 0.311 |
| Initiative-Imitate | 44.11 | 0.335 | 0.231 | 0.127 | 0.319 |

It can be seen from the above comparison that the session processing model, i.e., Initiative-Imitate proposed in some embodiments performs optimally in three of these indicators and also differs less from the optimal results in the other two indicators. In particular, the Initiative-Imitate model inherits the DeepCopy model and adds role state control and session reference information to it. The related results show that modeling the role state can further improve the effect of the model.

Each of the above indicators is an automatic indicator, the evaluation of which reflects the overall effect of each man-machine session model at the word level. Each of the above models is evaluated below through manual evaluation results. The manual evaluation results can reflect more the overall effect at the sentence level in the actual man-machine session process. In order to reflect the user's engagement in the man-machine session process, some embodiments add the engagement indicator to the manual evaluation indicators. Other indicators of manual evaluation also include fluency and coherence. The comparison results of each of the above models in terms of manual evaluation indicators are shown in Table 2 below.

TABLE 2

Comparison of the session processing model with other models

| Model Name | Fluency | Coherence | Engagement |
| --- | --- | --- | --- |
| seq2seq | 1.40 | 1.05 | 0.25 |
| seq2seq$_{attn}$ | 0.45 | 1.10 | 0.50 |
| CopyNet | 1.75 | 1.30 | 0.15 |
| Generative-base | 0.95 | 0.80 | 0.40 |
| DeepCopy | 1.8 | 1.68 | 0.30 |
| Initiative-Imitate | 1.8 | 1.75 | 0.70 |

From the comparison results in Table 2, it is found that the man-machine session models with the Copy mechanism, such as CopyNet, DeepCopy, and Initiative-Imitate, have better fluency and coherence, but the corresponding user's engagement is reduced due to the introduction of too much session reference information. The actual sessions of the man-machine session models show that the session robots ignore the content expressed by the users, talk to themselves, and pay no attention to the questions raised by the users. In addition, the attention mechanism enables the models in some embodiments to be greatly improved as a whole, mainly by considering the users' expression content, i.e., the historical session messages. According to the users' expression content, corresponding session messages can be generated by the session robots, which can ensure that the generated session messages are more accurate.

The comparison results in Table 1 and Table 2 show that the session processing models proposed in some embodiments rank top in all indicators and greatly enhance the engagement of the users in the man-machine session process, achieving a better man-machine interaction experience.

The above session processing models can be applied to various man-machine session systems, such as chat-type sessions and knowledge-recommendation-type sessions. The above session processing models can also be applied to products of various session-type chat services.

Figure 3A:
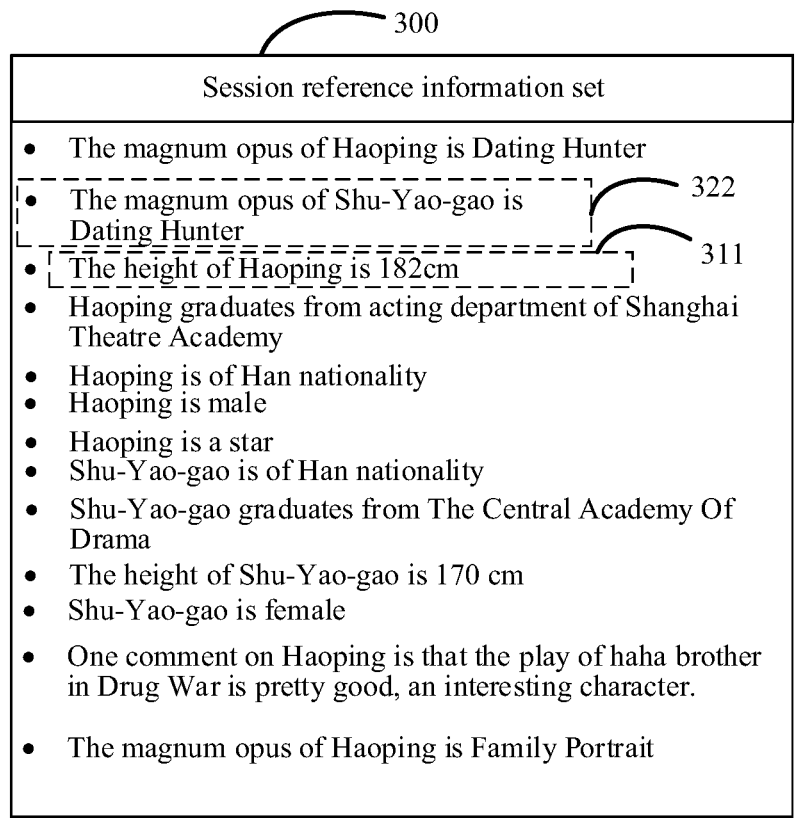
FIG. 3A is a schematic diagram of a session reference information set according to some embodiments.
Figure 3B:
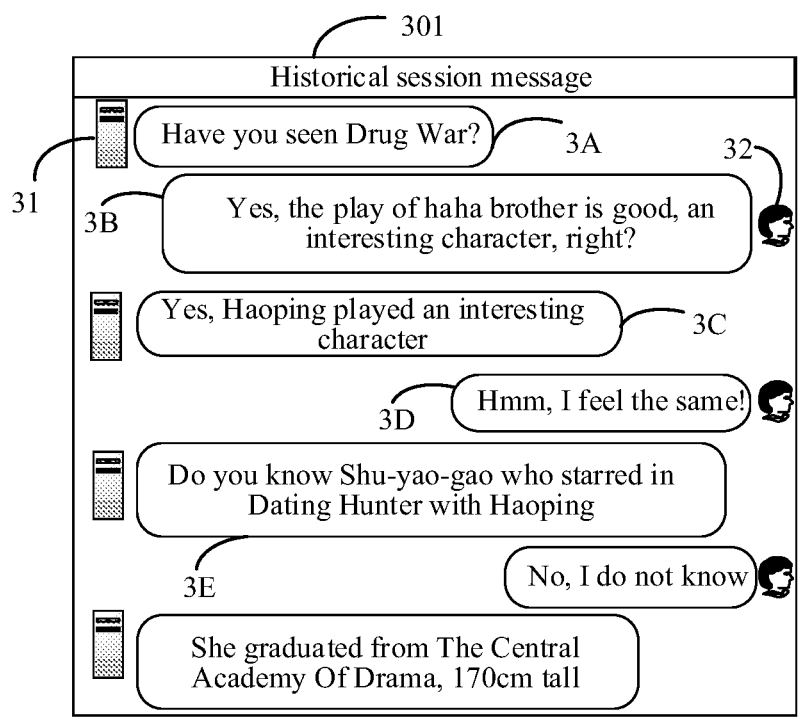
FIG. 3B is a schematic diagram of a man-machine session between a target user and a session robot according to some embodiments.

FIG. 3A is a schematic diagram of a session reference information set according to some embodiments. FIG. 3B is a schematic diagram of a session interface for a man-machine session between a target user and a session robot according to some embodiments.

In the session reference information set shown in FIG. 3A, 300 represents the session reference information set, which includes a plurality of pieces of session reference information. Assuming that the man-machine session shown in FIG. 3B is a chat-type session, each piece of session reference information in FIG. 3A may be information related to the topic of chatting. For example, if the topic of chatting is movie A, the session reference information included in the session reference information set is related to movie A. For example, session reference information 311 is an introduction to the heights of the main actors in movie A, and session reference information 322 is an introduction to the magnum opuses of the main actors in movie A.

In FIG. 3B, 301 represents the session interface for the man-machine session between the target user and the session robot. 31 is the identifier information of the session robot, and 32 is the identifier information of the target user. In the session interface shown in FIG. 3B, each piece of session information inputted by the session robot is generated by the computer device calling the above session processing model, and corresponds to the session role of the session robot each time of inputting the session message.

It can be seen from FIG. 3B that during a session with the target user, the session role of the session robot is constantly switched. For example, the session robot inputs "Have you seen Drug War?" in the session interface. In this session message, the session robot is designed to guide the target user to participate in the discussion of the movie, i.e., Drug War, and the session role of the session robot at this point is an active session role; and when the target user replies to the session robot with the session message of "Yes, . . . right?" shown as 3B in FIG. 3B, according to the historical session messages in the current man-machine session process and the session reference information set, the computer device can determine that at this point, the session robot needs to answer the question raised by the target user. Thus, the session role of the session robot needs to be switched from the previous active session role into a passive session role, so the computer device generates a session message corresponding to the passive session role, shown as 3C in FIG. 3B.

Then, the target user inputs a session message 3D for replying in response to the session message 3B inputted by the session robot. It can be found from 3D that the session message inputted by the target user is only an echo of the session message 3C, not an introduction to a new session, that is, the target user is in a passive session role. At this point, in order to continue the session, the session robot can input some session messages to elicit more session contents, that is, before a session message 3E is generated by the computer device, it is to be determined that the session robot is in an active session role, and then according to all the historical session messages in the session process and the session reference information set, the session message 3E corresponding to the active session role is generated.

It can be found from the above man-machine dialogue process that in the man-machine session process, based on the session processing model, a session message inputted by the session robot is generated, so that the session robot can be constantly switched between the active session role and the passive session role in the session process, so as to achieve the purpose that the session robot cannot only actively recommend the session reference information in the session reference information set to the user, but also answer the questions raised by the target user.

FIG. 3B is only an application scenario of a session processing model according to some embodiments. In actual application, the session processing model can also be applied to other scenarios. For example, in medical questions and answers, the computer device can call the session processing model to actively convey corresponding knowledge to the user using the knowledge in the healthcare knowledge base, and can also respond to the questions raised by the user. For example, the knowledge about sleep stored in the healthcare knowledge base is that {"Normal people sleep for 8-10 hours", "Overwork can lead to arthritis, spondylopathy, lumbar disc herniation, etc., and there may be kidney disease, myocardial strain and other diseases in internal medicine", "Too little sleep can make you feel hungrier than usual" . . . }. When the user asks about the question related to sleep, the session robot answers the related questions of the user based on the above knowledge and actively recommends some sleep-related tips to the user, which makes the whole session more interesting.

Figure 4:
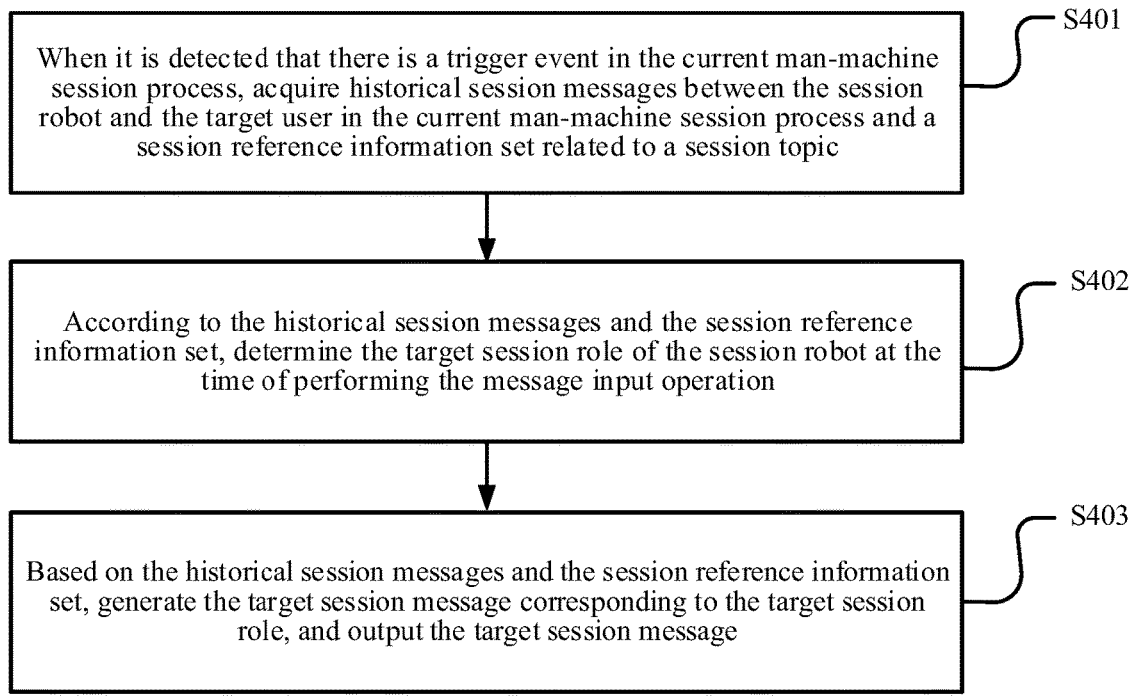
FIG. 4 is a schematic flowchart of one session message generation method according to some embodiments.

Based on the above session processing model, some embodiments provide a session message generation method. FIG. 4 is a schematic flowchart of a session message generation method according to some embodiments. The session message generation method as shown in FIG. 4 can be performed by the computer device which may be a server or a terminal device, and specifically can be performed by a processor of the computer device. The session message generation method as shown in FIG. 4 can include the following operations.

Operation S401, when it is detected that there is a trigger event in the current man-machine session process, historical session messages between a session robot and a target user in the current man-machine session process and a session reference information set related to a session topic are acquired.

In some embodiments, the current man-machine session between the session robot and the target user can be created when a session message display device detects a session creation event for creating the current man-machine session. The session creation event can include a session creation operation performed by the target user through the session message display device.

In some embodiments, the session message display device and the computer device for generating the session messages can be the same device, for example, both are smart phones, tablets, laptops, desktop computers, smart speakers, smart watches, smart vehicle-mounted devices, smart televisions and other devices. Alternatively, the session message display device may be any of the above devices. The computer device for generating the session messages may be a server that provides support for the man-machine session function in the session message display device, specifically an independent physical server, or may be a server cluster including a plurality of physical servers or a distributed system, or may be a cloud server providing basic cloud computing services, such as cloud services, a cloud database, cloud computing, a cloud function, cloud storage, a network service, cloud communication, a middleware service, a domain name service, a security service, a CDN, big data, and an artificial intelligence platform.

In an example embodiment, the target user can browse any information, such as recommendation information and medical knowledge, through the session message display device. The session message display device can display a trigger control for creating a man-machine session while displaying information such as movie recommendation information and medical knowledge; and when it is detected that the trigger control is triggered by the target user, it can be determined that the session creation operation is performed by the target user, and at this point, the session message display device can create the current man-machine session between the target user and the session robot.

Figure 5A:
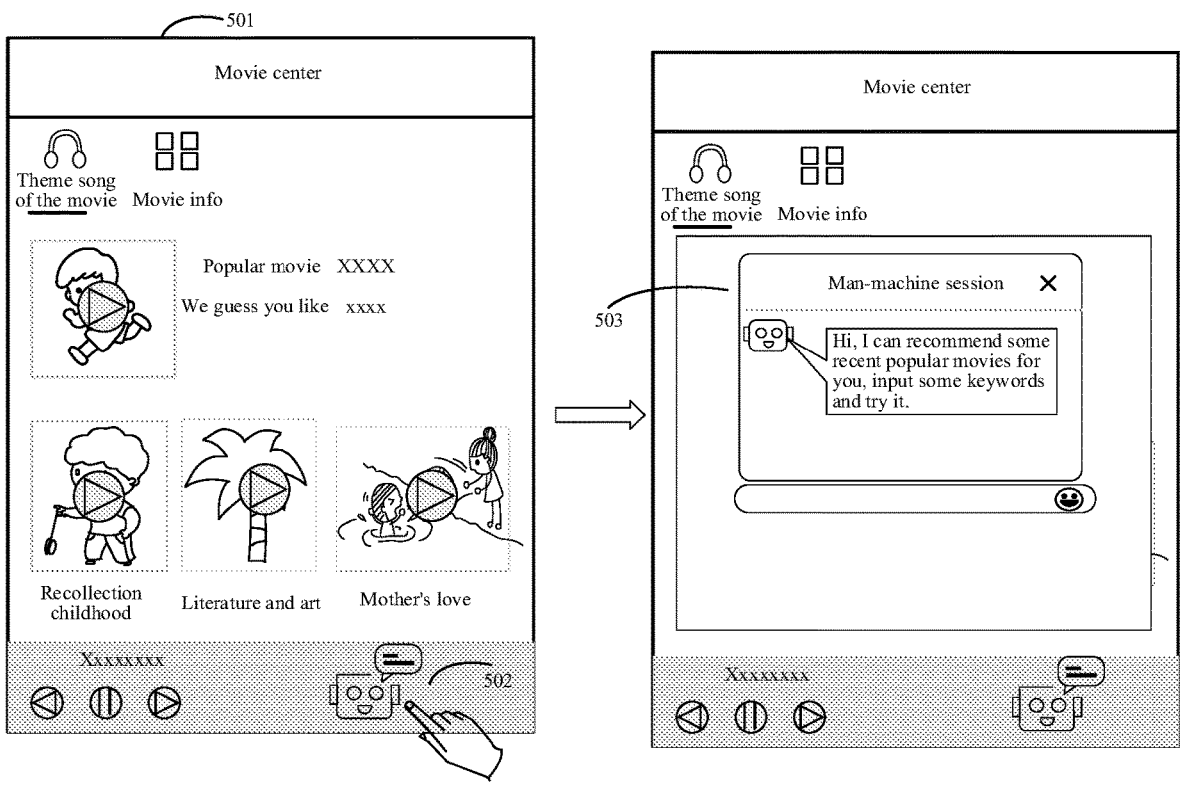
FIG. 5A is one schematic diagram of creating a man-machine session according to some embodiments.

FIG. 5A is a schematic diagram of creating a man-machine session according to some embodiments. 501 represents an interface where the target user is browsing the movie recommendation information. The interface can include a trigger control 502 for creating the man-machine session; and when it is detected that the target user has triggered a click operation on the trigger control 502, the session message display device can create the man-machine session between the target user and the session robot and also, can display the man-machine session window in the interface, shown as 503 in FIG. 5A.

In another example embodiment, the session message display device can specify some target information in advance, and when it is detected that the target user browses the target information, a prompt window for creating the man-machine session will pop up; and when it is detected that the target user has triggered a touch control operation on a confirm button in the prompt window, it is determined the session creation operation is performed by the target user, and in response to the session creation operation, the current man-machine session between the target user and the session robot is created. The target information can be any information that can be browsed by the target user, such as information that needs to be browsed by the target user after registration, information that the target user needs to browse after becoming a member of a certain platform, and some information including specific words, e.g., information including the name of the actor Zhang Moumou, and information including the name of XX disease.

Figure 5B:
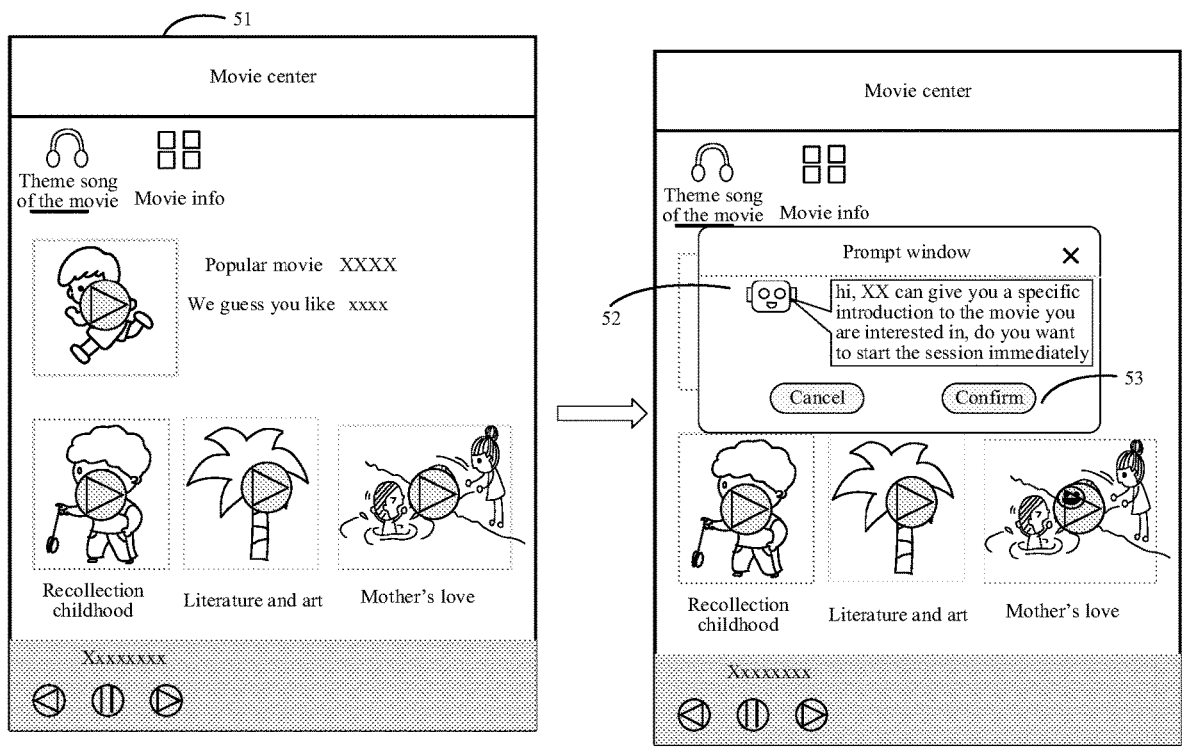
FIG. 5B is another schematic diagram of creating a man-machine session according to some embodiments.

For example, referring to FIG. 5B, it is another schematic diagram of creating a man-machine session according to some embodiments. 51 represents an interface where the target user is browsing the target information. When a session display device detects that the target user is browsing the target information, a prompt window for creating the man-machine session can be popped up in the interface, shown as 52. The prompt window 52 includes prompt information, such as "XX can give you a more specific introduction to the movie you are interested in, do you want to start the session immediately", for guiding the target user to create the man-machine session. The prompt window 52 can also include a confirm button 53. If it is detected that the confirm button 53 is clicked by the target user, it is determined that the session creation operation is performed by the target user, and at this point, the session message display device can create the current man-machine session between the target user and the session robot.

In other embodiments, the session creation event can also include the session message display device detects that the target user browses some specified information. In an example embodiment, when the session message display device detects that the target user browses specified information, the current man-machine session between the session robot and the target user is directly created and displayed.

After the current man-machine session between the target user and the session robot is created by the session message display device, the target user and the session robot can have a man-machine session. In the current man-machine session process, when it is detected by the computer device for generating session messages that there is a trigger event, through operation S401, historical session messages between the session robot and the target user in the current man-machine session process and the session reference information set related to a session topic are acquired. The trigger event is used for triggering the session robot to perform a message input operation in the current man-machine session process.

After the current man-machine session between the session robot and the target user is created by the session message display device, the current man-machine session process can be monitored in real time, and when it is detected that there is a trigger event in the current man-machine session process, historical session messages between the session robot and the target user in the current man-machine session process are acquired. The trigger event is used for triggering the session robot to perform a message input operation in the current man-machine session process, i.e., for indicating that it is the turn of the session robot to speak in the current man-machine session process.

In some embodiments, the above trigger event can be: the target user inputs a session message in the current man-machine session process. For example, the target user inputs a session message "What are the recent high-rated movies to recommend?" in the current man-machine session process, and for another example, the target user inputs a session message "How does lack of sleep affect the body?" in the current man-machine session process. At this point, the session robot is required to reply to the session message inputted by the target user, and at this point, it can be considered that there is a trigger event in the current man-machine session process.

In some embodiments, the trigger event can also be: after the session robot inputs a session message, it is not detected that the target user inputs a new session message within a preset time. For example, the target user inputs a session message "What are the recent high-rated movies to recommend?", and the session robot responds to the session message with a session message "Drug War starring XXX is good". After the session robot finishes inputting the session message, if it does not detect that the target user inputs a session message within a preset time period (such as 2 minutes or 1 minute), it can continue to perform the session message input operation, for example, it can input a session message to briefly introduce the theme of a movie.

The historical session messages in operation S401 are all session messages generated in the current man-machine session in the period from the creation of the current man-machine session between the target user and the session robot to the detection of the trigger event. These session messages may include session messages inputted by the target user, and may also include session messages inputted by the session robot. The session message inputted by the session robot may specifically include session messages inputted by the session robot in an active session role, and/or session messages inputted by the session robot in a passive session role. Referring to FIG. 3B, for example, 3A, 3B, 3C, 3D and 3E are all historical session messages in the current man-machine session process. 3B and 3D are inputted by the target user, 3A and 3E are session messages inputted by the session robot in an active session role, and 3C is a session message inputted by the session robot in a passive session role.

In some embodiments, after being acquired, the historical session messages can be concatenated in the chronological order in which they are generated. The concatenated historical session messages can be represented by the following formula (1):

$$x = \{x_1, x_2, \ldots, x_{n_x}\} \quad (1)$$

In formula (1), x represents a historical session message, $x_1$ represents the first word in the historical session message, $x_2$ represents the second word in the historical session message, in a similar fashion, $x_{n_x}$ represents the last word in the historical session message, and $n_x$ represents the total number of words included in the historical session message.

In an embodiment, session reference information sets (which may also be called knowledge information) related to session topics may be acquired according to the corresponding relationships between a plurality of session reference information sets preset by a computer device for generating session messages and the session topics. For example, the computer device presets that the medical session topic corresponds to the first session reference information set, and the movie recommendation type session topic corresponds to the second session reference information set; and the shopping consultation type session topic corresponds to the third session reference information set. Correspondingly, in response to the trigger event, the computer device judges the session topic of the current man-machine session between the session robot and the target user; and the session reference information set corresponding to the session topic of the current man-machine session is selected from the above plurality of corresponding relationships.

In an embodiment, the session reference information set may include a plurality of pieces of session reference information. Each piece of session reference information may include a plurality of words. Optionally, in some embodiments, the session reference information set can be represented by the following formula (2):

$$k = \{k_1, k_2, \ldots, k_{n_k}\} \quad (2)$$

In formula (2), $k_1$ represents the first session reference information included in the session reference information set, $k_2$ represents the second session reference information included in the session reference information set, in a similar fashion, $k_{n_k}$ represents the last session reference information included in the session reference information set, and $n_k$ represents the total number of the session reference information included in the session reference information set.

Each piece of session reference information is composed of a plurality of words. Any piece of session reference information is represented below by formula (3):

$$k_i = \{k_{i_1}, k_{i_2}, \ldots k_{i_{n_{k_i}}}\} \quad (3)$$

In formula (3), $k_i$ represents the $i^{th}$ session reference information included in the session reference information set, $k_{i_1}$ represents the first word included in the $i^{th}$ session reference information, $k_{i_2}$ represents the second word included in the $i^{th}$ session reference information, and in a similar fashion, $n_{k_i}$ represents the total number of words included in the $i^{th}$ session reference information.

Operation S402, according to the historical session messages and the session reference information set, the target session role of the session robot at the time of performing a message input operation is determined.

As can be seen from the foregoing, in any session, session participants in different session roles play different roles in the session, and the information included in the session messages inputted by the session participants is also different. For example, in any session, a session participant in an active session role is designed to throw out more session information to guide other session participants to input session messages in the session, thereby ensuring that the session continues. Thus, the session messages inputted by the active session role need to include more information; and for another example, in any session, a session participant in a passive session role is designed to echo the session messages inputted by the session guide, so the session messages inputted by the session participant in the passive role do not need to include much information, but only need to achieve the purpose of answering or echoing the session messages of the active session roles.

The above rules are no exception in man-machine sessions. In some embodiments, in order to ensure that the target user has a sufficient sense of participation in the current man-machine session process, and to ensure that the session message inputted by the session robot is not simple and boring, when the message input operation is performed by the session robot, the current target session role of the session robot can be determined, so that the session robot outputs a session message corresponding to the target session role.

In order to achieve the above purpose, in some embodiments, operation S402 of determining the target session role of the session robot at the time of performing a message input operation according to the historical session messages and the session reference information set is required. The target session role may be an active session role or a passive session role.

In an embodiment, determining the target session role of the session robot at the time of performing a message input operation according to the historical session messages and the session reference information set includes: determining a role prediction parameter for predicting the session role state of the session robot according to the historical session messages and the session reference information set; and then, determining the session role state of the session robot based on a role state prediction rule and according to the role prediction parameter, and using the session role indicated by the session role state as the target session role of the session robot.

In an embodiment, the above determining the target session role of the session robot at the time of performing a message input operation according to the historical session messages and the session reference information set may be performed by the computer device calling the session processing model. As can be seen from the foregoing, the session processing model may include a knowledge fusion module and a session message generator module. Correspondingly, determining a role prediction parameter for predicting the session role of the session robot according to the historical session messages and the session reference information set may be performed by calling the knowledge fusion module; and determining the session role state of the session robot based on a role state prediction rule and according to the role prediction parameter, and using the session role indicated by the session role state as the target session role of the session robot may be performed by the session message generator module.

In some embodiments, determining the role prediction parameter according to the historical session messages and the session reference information set may include: encoding the historical session messages to obtain a first encoding result; setting a corresponding weight value for each piece of session reference information in the session reference information set according to the first encoding result; encoding each piece of session reference information in the session reference information set based on the corresponding weight value for each piece of session reference information in the session reference information set to obtain a second encoding result corresponding to each piece of session reference information; and determining a role prediction parameter based on the second encoding result corresponding to each piece of session reference information and the role prediction parameter determination rule.

In an embodiment, the session message processing model may also include an encoder. The encoder includes a historical session encoder and a reference knowledge encoder. Encoding the historical session messages to obtain a first encoding result may be performed by the historical session encoder; and encoding each piece of session reference information in the session reference information set based on the corresponding weight value for each piece of session reference information in the session reference information set to obtain a second encoding result corresponding to each piece of session reference information may be performed by the reference knowledge encoder.

The historical session encoder may be a neural network of a recursive neural network (RNN) type. The first encoding result may be a hidden state set. The hidden state set includes a plurality of hidden states. The total number of the plurality of hidden states is equal to the total number of words included in the historical session message. For example, if the historical session message includes 5 words, the hidden state set includes 5 hidden states.

For instance, assuming that the first encoding result may be represented by the following formula (4), in formula (4), C represents the first encoding result, $h_1$ represents the first hidden state, and $h_{n_x}$ represents the last hidden state:

$$C=(\{h_1, \ldots, h_{n_x}\}) \quad (4)$$

When the historical session encoder is used for encoding the historical session message, it takes the word as the unit. Specifically, the historical session encoder encodes the first word to obtain a first hidden state; then, the historical session encoder encodes the second word and the first hidden state to obtain a second hidden state; and in a similar fashion, a plurality of hidden states are obtained. As can be seen, the first encoding result includes a plurality of hidden states, and the latter hidden state is obtained based on the encoding of the word corresponding to the hidden state and the former hidden state. The process may be represented as formula (5):

$$h_t=f(x_t,h_{t-1}) \quad (5)$$

In formula (5), f represents encoding, $h_t$ represents the $t^{th}$ hidden state in the plurality of hidden states, $h_{t-1}$ represents the (t-1)th hidden state, and $x_t$ represents the $t^{th}$ word in the historical session message.

In an embodiment, the reference knowledge encoder may be a neural network of an RNN type with the same structure and different parameters as the historical session encoder. The process of encoding, by the reference knowledge encoder, the corresponding session reference information based on the weight value corresponding to each piece of session reference information may also be performed word by word, and is similar to the process of encoding, by the above historical session encoder, the historical session message. After encoding each piece of session reference information, a second encoding result corresponding to each piece of session reference information may be obtained. The second encoding result may also be a hidden state set.

For instance, the second encoding result corresponding to the $i^{th}$ session reference information may be represented as $h_t^{k_i}$, where t is equal to or greater than 1, and less than or equal to the total number $n_{k_i}$ of words included in the $i^{th}$ session reference information.

After the second encoding result is acquired by the computer device, a role prediction parameter may be determined based on the second encoding result corresponding to each piece of session reference information and the role prediction parameter determination rule. In a specific implementation, based on the second encoding result corresponding to each piece of session reference information, a first joint context vector is determined; and based on the role prediction parameter determination rule, according to the first joint context vector, a role prediction parameter is determined. Determining the first joint context vector based on the second encoding result corresponding to each piece of session reference information may include: adding the last hidden state in each second encoding result, and the adding result may serve as the first joint context vector.

For instance, assuming that the last hidden state in the second encoding result corresponding to the $i^{th}$ piece of session reference information is represented $ash_j^{k_i}$, the last hidden states in the second encoding results corresponding to all pieces of session reference information are added to obtain the first joint context vector, which can be represented by the following formula (6):

$$\tilde{h}_k=\Sigma_{i=1}^{n_k}h_j^{k_i} \quad (6)$$

In formula (6), $\tilde{h}_k$ represents a second joint context vector, and $n_k$ represents the total number of session reference information included in the session reference information set.

After the first joint context vector is obtained, the first joint context vector and other model parameters are inputted into the role prediction parameter determination rule for operation, and then a role prediction parameter may be obtained. The process may be represented by the following formula (7):

$$f_k=\sigma(W_2^{f_k}\tilde{h}_k+b^{f_k}) \quad (7)$$

In formula (7), $f_k$ represents the role prediction parameter, $\sigma$, $W_2^{f_k}$ and $b^{f_k}$ represent the model parameter.

As can be seen from the foregoing, after being obtained, the role prediction parameter may be inputted into the session role state prediction rule for operation so as to obtain the session role state. The operation may be represented by the following formula (8):

$$role_p=\sigma(Wf_k+b) \quad (8)$$

In formula (8), $role_p$ represents the session role state, and W and b represent the model parameter. After the session role state is obtained according to formula (8), the session role indicated by the session role state is determined as a target session role of the session robot at the time of performing a message input operation. Optionally, the session role state may include 0 and 1. The session role indicated by 0 is a passive session role; the session role indicated by 1 is an active session role; or the session role indicated by 0 is the active session role, and the session role indicated by 1 is the passive session role.

Operation S403, based on the historical session messages and the session reference information set, a target session message corresponding to the target session role is generated and outputted.

After determining the target session role of the session robot at the time of performing a message input operation in the current man-machine session process in operation S402, according to the historical session messages and the session reference information set, a target session message that matches the target session role may be generated as a session message outputted by the session robot at the time of performing the message input operation in the current man-machine session process.

In an embodiment, generating a target session message that matches the target session role according to the historical session messages and the session reference information set may be: knowing what information is communicated in the current man-machine session process according to the historical session messages; and in combination with the session reference information set, specifying which session reference information in the session reference information set can be used for answering questions raised by the target user in historical session messages, or transmitting which session reference information to the target user.

In an embodiment, generating a target session message that matches the target session role according to the historical session messages and the session reference information set may be performed by the computer device calling the session message generator module in the session processing model.

In an embodiment, if the computer device for generating session messages and the session message display device are not the same device, outputting a target session message may include: sending the target session message by the computer device to the session message display device, and displaying the target session message by the session message display device to the target user; and if the computer device for generating session messages and the session message display device are the same device, outputting a target session message may include: displaying the target session message into a window for performing the current man-machine session between the target user and the session robot.

In some embodiments, in the current man-machine session process of the session robot and the target user, it is detected that there is a trigger event for triggering the session robot to perform a message input operation in the current man-machine session process, and the historical session messages between the target user and the session robot in the current man-machine session process and the session reference information set related to the topic of the current man-machine session may be acquired; further, according to the historical session message set and the session reference information set, the target session role of the session robot at the time of performing the message input operation is determined; and then, based on the historical session messages and the session reference information set, a target session message corresponding to the target session role is generated and outputted. Thus, in the current man-machine session process, the session message that matches the role state of the session robot may be generated in real time. Compared with the session form that the session robot blindly and passively replies to the user's message in the related art, the form of man-machine session is enriched, the precision of man-machine interaction is improved, and the user's interest in session can also be improved more easily.

Figure 6:
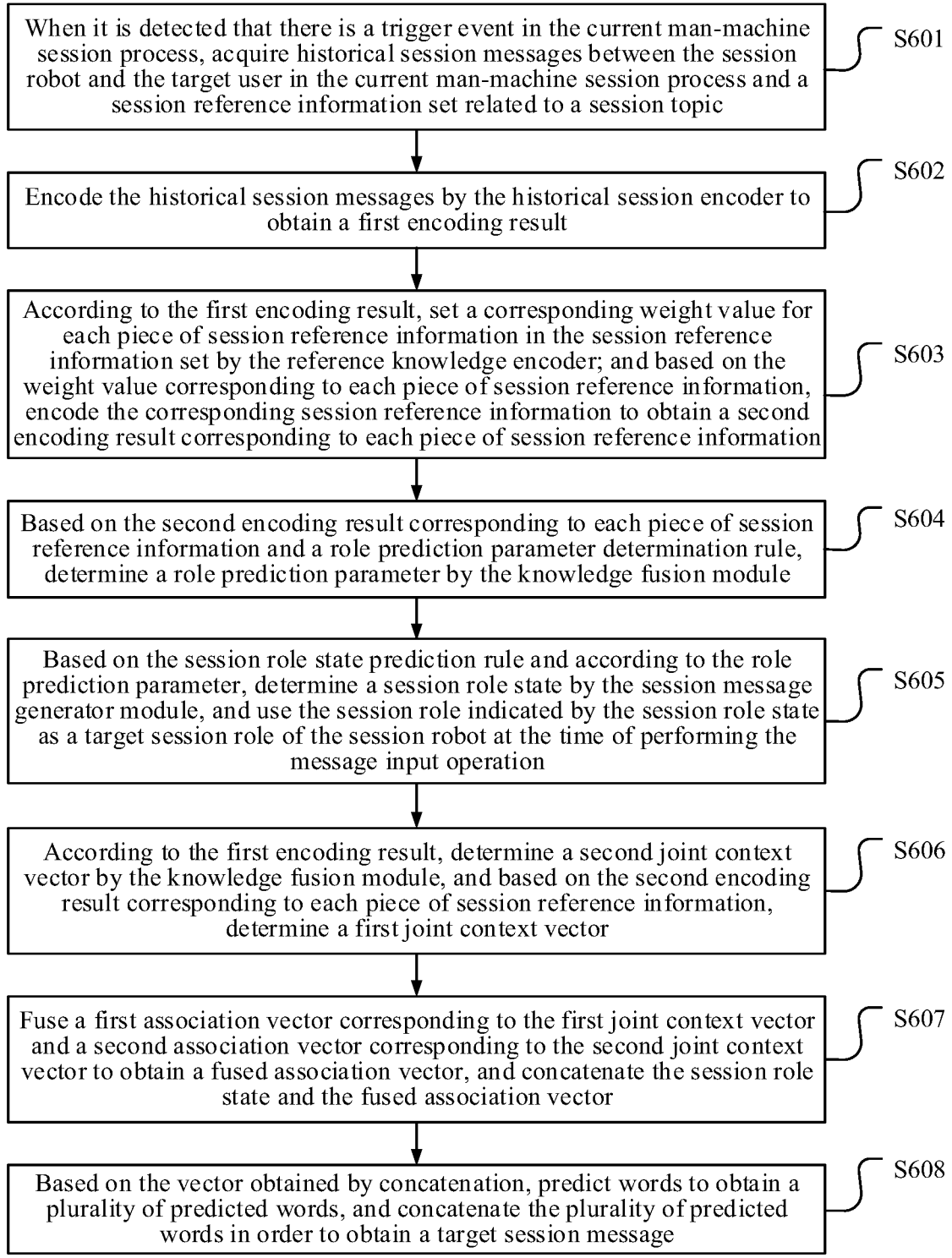
FIG. 6 is a schematic flowchart of another session message generation method according to some embodiments.

Based on the above session message generation method and session processing model, some embodiments provide another session message generation method. FIG. 6 is a schematic flowchart of another session message generation method according to some embodiments. The session message generation method as shown in FIG. 6 may be performed by the computer device, and specifically may be performed by the processor of the computer device calling the session processing model. The session message generation method as shown in FIG. 6 may include the following operations.

Operation S601, when it is detected that there is a trigger event in the current man-machine session process, historical session messages between a session robot and a target user in the current man-machine session process and a session reference information set related to a session topic are acquired.

Operation S602, the historical session messages are encoded by a historical session encoder to obtain a first encoding result.

Operation S603, a corresponding weight value for each piece of session reference information in the session reference information set is set by a reference knowledge encoder according to the first encoding result; and the corresponding session reference information is encoded based on the corresponding weight value for each piece of session reference information to obtain a second encoding result corresponding to each piece of session reference information.

Operation S604, a role prediction parameter is determined by a knowledge fusion module based on the second encoding result corresponding to each piece of session reference information and the role prediction parameter determination rule.

Operation S605, the session role state is determined by a session message generator module based on a session role state prediction rule and according to the role prediction parameter, and the session role indicated by the session role state is used as the target session role of the session robot at the time of performing a message input operation.

In some embodiments, some feasible implementations included in operation S601 to operation S605 can refer to the description of related operations in the embodiment of FIG. 4, which is not described in detail.

As can be seen from the foregoing, the historical session encoder, the reference knowledge encoder, the knowledge fusion module and the session message generator module are all components of the session processing model. The structure of the session processing model is shown in FIG. 1. The session processing model is obtained by training based on a sample information set and a target loss function; and the sample information set includes sample historical session messages, a sample session reference information set and supervision session messages corresponding to a preset session robot.

The target loss function may include a first sub loss function, a second sub loss function and a third sub loss function. In an implementation, the target loss function may be obtained by adding the first sub loss function, the second sub loss function and the third sub loss function. For example, the target loss function may be represented by the following formula (9):

$$L_{OSS}=L_{NLL}+L_{BOW}+L_{Role} \tag{9}$$

In formula (9), $L_{Oss}$ represents the target loss function, $L_{NLL}$ represents the first sub loss function, $L_{BOW}$ represents the second sub loss function, and $L_{Role}$ represents the third sub loss function.

In an embodiment, the first sub loss function may be determined based on the supervision session messages and the sample session messages. The sample session messages are generated by the session processing model based on the sample historical session messages and the sample session reference information set. The session messages corresponding to the sample session role of the session robot and the sample session role of the session robot are obtained by prediction based on the sample historical session messages and the sample session reference information set.

It is to be understood that the implementation of the session processing model obtaining the sample session role of the session robot by prediction based on the sample historical session messages and the sample session reference information set is the same as some implementations included in operation S402 in the embodiment shown in FIG. 4. In addition, the implementation of the session processing model generating a session message corresponding to the sample session role of the session robot based on the sample historical session messages and the sample session reference information set is the same as the implementation included in operation S403 in the embodiment shown in FIG. 4.

In an embodiment, the first sub loss function may be a minus-log-likelihood loss function, which is represented by the following formula (10):

$$L_{NLL} = -\frac{1}{|y|}\sum_{t=1}^{|y|} \log(p_t(y_t \mid y < t), x', k') \tag{10}$$

In formula (10), $L_{NLL}$ represents the first sub loss function, $y_t$ represents the $t^{th}$ word in the supervision session message, $|y|$ represents the total number of words included in the supervision session message, x' represents the sample historical session message, k' represents the sample session reference information set, and $p_t$ represents the conditional probability of the outputted $y_t$ for position t under the generated content less than position t.

In an embodiment, the second sub loss function is determined based on the correlation between the supervision session messages and the sample session reference information set. The second sub loss function is introduced to make the session processing model consider the influence of corresponding knowledge as much as possible. Optionally, the second sub loss function may be a relatively-classical bag-of-word loss function, which may be represented as the following formula (11):

$$L_{BOW} = -\frac{1}{|y|}\sum_{t=1}^{|y|} \log(p(y_t \mid \tilde{h}_{k'})) \tag{11}$$

In formula (11), $\tilde{h}_{k'}$ represents the second joint context vector generated in the process of training the session processing model, and the solution of $(y_t|\tilde{h}_{k'})$ can be shown as formula (12):

$$p(y_t|\tilde{h}_{k'}) = \text{softmax}(MLP(\tilde{h}_{k'})) \tag{12}$$

In formula (12), the function of MLP plays a role in converting $\tilde{h}_{k'}$ into a vector with the length being equal to that of a target word, and the function of softmax represents obtaining the distribution of the converted $\tilde{h}_{k'}$.

In an embodiment, the third sub loss function is determined based on the session role state corresponding to the sample session role of the session robot. In some embodiments, modeling of the role state is introduced when the session message of the session robot is generated, and thus in order to improve the accuracy of role state modeling of the session processing model, it is necessary to take the session role state into account in the training loss function of the session processing model. Optionally, the third sub loss function may be a cross-entropy loss function, which may be represented by formula (13):

$$L_{Role} = BCE(\text{role}_p, \text{role}) \tag{13}$$

In formula (13), $\text{role}_p$ represents the session role state corresponding to the sample session role, and role represents the session role state corresponding to the real session role of the session robot. BCE represents a binary cross-entropy function.

Operation S606, the second joint context vector is determined by the knowledge fusion module according to the first encoding result, and the first joint context vector is determined based on the second encoding result corresponding to each piece of session reference information.

In an embodiment, after determining the target session role of the session robot in the man-machine session process through operation S601 to operation S605, the target session message corresponding to the target session role is further generated through operation S606 to operation S608.

The main idea of generating the target session message through operation S606 to operation S608 is that: the historical session messages and the session reference information set are fused; then, the fused result and the session role state are concatenated, and words are further predicted according to the concatenated result to obtain a plurality of predicted words; and finally, all predicted words are concatenated in a sequence to form the target session message.

In an example embodiment, the fusion of the historical session messages and the session reference information set is substantially realized according to the first encoding result obtained by encoding the historical session messages by the historical session encoder and a plurality of second encoding results obtained by encoding all pieces of session reference information by the reference knowledge encoder. Specifically, in operation S606, the second joint context vector is determined by the knowledge fusion module according to the first encoding result, and the first joint context vector is determined based on the second encoding result corresponding to each piece of session reference information.

As can be seen from the foregoing, the first encoding result includes a plurality of hidden states obtained by encoding the historical session messages. Determining the second joint context vector according to the first encoding result may include: using the last hidden state in the first encoding result as the second joint context vector. For example, the second joint context vector may be represented as the following formula (14):

$$\tilde{h}_x = h_{n_x} \tag{14}$$

In formula (14), $\tilde{h}_x$ represents the second joint context vector, and $h_{n_x}$ represents the last hidden state included in the first encoding result.

The second encoding result corresponding to each piece of reference session information includes a plurality of hidden states obtained by encoding the corresponding reference session information. Determining the first joint context vector according to the second encoding result corresponding to each piece of reference session information may include: performing addition operation on the last hidden state included in each second encoding result, and using the result of addition operation as the first joint context vector.

In an example embodiment, determining the first joint context vector according to the second encoding result corresponding to each piece of session reference information may be represented by the above formula (6).

Operation S607, a first association vector corresponding to the first joint context vector and a second association vector corresponding to the second joint context vector are fused to obtain a fused association vector, and the session role state and the fused association vector are concatenated.

In an embodiment, the first association vector corresponding to the first joint context vector may be obtained by a preset operation of the first joint context vector. Similarly, the second association vector corresponding to the second joint context vector may be obtained by a preset operation of the second joint context vector.

Assuming that the first joint context vector is represented as $\bar{h}_k$, the first association vector corresponding to the first joint context vector is represented as $\tilde{C}_k$; and assuming that the second joint context vector is represented as $\bar{h}_x$, the second association vector corresponding to the second joint context vector is represented as $\tilde{C}_x$. The relationship between the first joint context vector and the first association vector and the relationship between the second joint context vector and the second association vector each can be represented by the following formula (15):

$$\bar{h}_i = \text{parameter} \odot \tanh(\tilde{C}_i) \tag{15}$$

In formula (15), $\bar{h}_i$ represents one joint context vector, and $\tilde{C}_i$ represents one association vector corresponding to the joint context vector; the value of i is x and h, and when i is x, $\bar{h}_i$ represents the second joint context vector, and $\tilde{C}_i$ represents the second association vector corresponding to the second joint context vector; and when is h, $\bar{h}_i$ represents the first joint context vector, and $\tilde{C}_i$ represents the first association vector corresponding to the first joint context vector.

In an embodiment, fusing the first association vector corresponding to the first joint context vector and the second association vector corresponding to the second joint context vector to obtain a fused association vector includes: using the role prediction parameter as the first reference weight at the time of generating the target session message based on the session reference information set, and based on the reference weight determination rule and according to the second joint context vector, determining the second reference weight at the time of generating the target session message based on the historical session messages; performing a multiplication operation on the first reference weight and the first association vector to obtain the first operation result, and performing a multiplication operation on the second association vector and the second reference weight to obtain the second operation result; and fusing the first operation result and the second operation result to obtain a fused association vector.

It is to be understood that the first reference weight of the session reference information at the time of generating the target session message is determined according to the role prediction parameter of the session robot, and if the first reference weight value is greater than the second reference weight, the target session message is generated with more reference to the session reference information set than reference to the historical session messages; otherwise, the reference to the historical session messages is more than the reference to the session reference information set.

It can be known that if the target session role of the session robot is an active session role, the session robot needs to guide the current man-machine session, and thus the target session message of the session robot is generated with more reference to the session reference information set. Otherwise, if the session role of the session robot is a passive session role, the session robot needs to reply to or echo the session message inputted by the target user more often, and thus the target session message of the session robot is generated with more reference to the historical session messages.

As can be seen, in some embodiments, based on the session role of the session robot in the current man-machine session process, how much the session reference information is fused at the moment of generating the session message inputted by the session robot is controlled. The phenomenon in the related art of ignoring the session message of the target user when the session robot blindly plays an active session role is avoided. In some embodiments, the session role of the session robot is intelligently switched, thereby improving the target user's sense of participation in the current man-machine session process.

In an embodiment, based on the reference weight determination rule and according to the second joint context vector, determining the second reference weight of the historical session message at the time of generating the target session message may be represented by the following formula (16). Assuming that the second reference weight is represented as $f_x$, the reference weight determination rule is represented as formula (16):

$$f_x = \sigma(W_1^{f_x} \bar{h}_x + b^{f_x}) \tag{16}$$

In formula (16), $W_1^{f_x}$ and $b^{f_x}$ each represent a model parameter required for computing $f_x$.

In an embodiment, a multiplication operation is performed on the first reference weight and the second association vector to obtain the first operation result, a multiplication operation is performed on the second association vector and the second reference weight to obtain the second operation result, and the first operation result and the second operation result are fused to obtain a fused association vector, which may be represented by the following formula (17):

$$C = i \odot u + f_x \odot \tilde{C}_x + f_k \odot \tilde{C}_k \tag{17}$$

In formula (17), C represents the fused association vector, $f_x$ represents the second reference weight, and $\tilde{C}_x$ represents the second association vector. As can be seen from the foregoing, $f_k$ represents the role prediction parameter, i.e., the first reference weight, and $\tilde{C}_k$ represents the first association vector. i and u are obtained by computing according to the model parameters of the session processing model.

Parameter i is determined according to the first joint context vector, the second joint context vector and some other model parameters. For example, the operation of parameter i may be represented by the following formula (18). In formula (18), $\sigma$, $W_1^i$, $W_2^i$, and $b^i$ each represent a model parameter required for computing i.

$$i = \sigma(W_1^i \bar{h}_x + W_2^i \bar{h}_k + b^i) \tag{18}$$

Parameter u may be computed by the following formula (19). In formula (19), $W_1^u$, $W_2^u$, and $b^u$ each represent a model parameter required for computing u.

$$u = \sigma(W_1^u \bar{h}_x + W_1^u \bar{h}_k + b^u) \tag{19}$$

Figure 7:
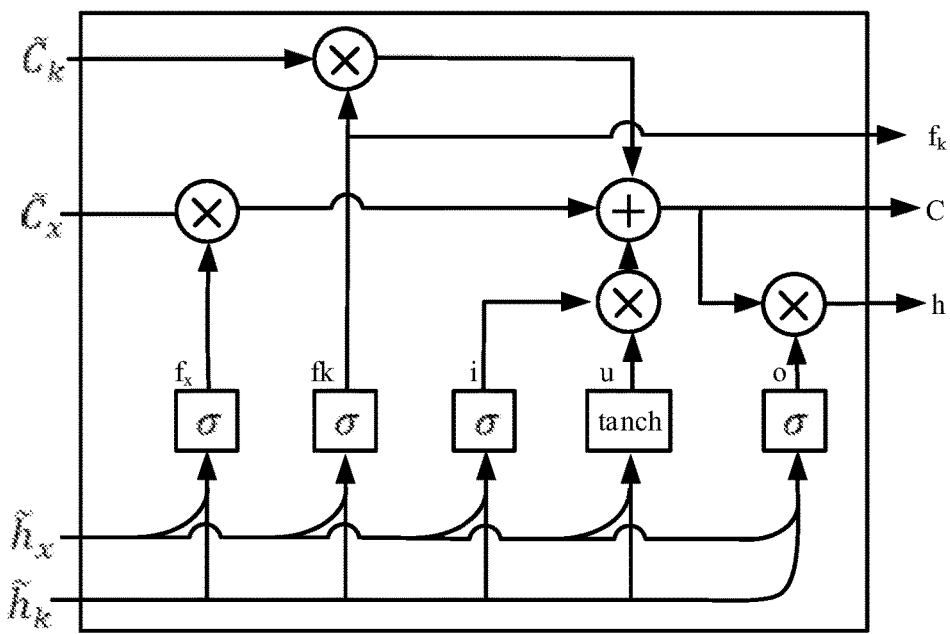
FIG. 7 is a schematic diagram of fusion of a first association vector and a second association vector according to some embodiments.

Based on the above description, the process of fusing the first association vector and the second association vector to obtain a fused association vector is shown in FIG. 7. As can be seen from FIG. 7, in the process of fusing the first association vector and the second association vector, the first joint context vector $\tilde{h}_k$, the first association vector $\tilde{C}_k$ corresponding to the first joint context vector, the second joint context vector $\tilde{h}_x$ and the second association vector $\tilde{C}_x$ corresponding to the second joint context vector are inputted into knowledge fusion module 701, and the knowledge fusion module 701 acquires parameters i, u, $f_x$ and $f_k$; then, a multiplication operation is performed on i and u, a multiplication operation is performed on $f_x$ and $\tilde{C}_x$, and a multiplication operation is performed on $f_k$ and $\tilde{C}_k$; and the results of the three multiplication operations are added to obtain fused association vector C.

In an embodiment, after the fused association vector is obtained, the first joint context vector and the second joint context vector may also be fused by formula (20) to obtain fused vector h:

$$h = o \odot \tanh(c) \qquad (20)$$

In formula (20), the computing mode of o may be: $o = \sigma(W_1^o h_x + W_2^o \tilde{h}_k + b^o)$, where $W_1^o$, $W_2^o$ and $b^o$ each represent a model parameter required for computing o.

Operation S608, based on vector obtained by concatenation, words are predicted to obtain a plurality of predicted words, and the plurality of predicted words are concatenated in a sequence to obtain the target session message.

After the fused association vector C is obtained by operation S607, C and the session role state may be concatenated, and according to the concatenated result, words are predicted to obtain a plurality of predicted words, and the plurality of predicted words are concatenated in a sequence so that the target session message can be obtained.

In some embodiments, based on the vector obtained by concatenation, predicting words to obtain a plurality of predicted words, and concatenating the plurality of predicted words in a sequence to obtain the target session message may include: acquiring at least one candidate word and acquiring the prediction probability of each of the at least one candidate word as the $N^{th}$ predicted word based on the vector obtained by concatenation, the N being an integer equal to or greater than 1; selecting the candidate word with the maximum prediction probability from the at least one candidate word as the $N^{th}$ predicted word; if the session message obtained by concatenating the former N predicted words in a sequence meets the generation condition of the session message, using the session message obtained by concatenating the former N predicted words in a sequence as the target session message and stopping the above process; and if the session message obtained by concatenating the former N predicted words in a sequence does not meet the generation condition of the session message, performing the N-plus-1 operation and repeating the above process.

In some embodiments, acquiring at least one candidate word includes: performing deduplication on a plurality of words in a first word set included in a preset word list, a plurality of words in a second word set included in the historical session message and a plurality of words in a third word set included in each piece of reference session information to obtain a plurality of candidate words; and acquiring the prediction probability of each of the at least one candidate word as the $N^{th}$ predicted word based on the vector obtained by concatenation includes: determining the word set to which any of the at least one candidate word belongs, and based on the concatenated result, determining the first probability of the candidate word as the $N^{th}$ predicted word in the word set to which the candidate word belongs; and based on the first probability of the candidate word as the $N^{th}$ predicted word in the word set to which the candidate word belongs, determining the prediction probability of the candidate word as the $N^{th}$ predicted word.

In an example embodiments, based on the first probability of any candidate word as the $N^{th}$ predicted word in the word set to which the candidate word belongs, determining the prediction probability of the candidate word as the $N^{th}$ predicted word includes: if the number of the word set to which the candidate word belongs is one, determining the first probability of the candidate word as the $N^{th}$ predicted word in the word set to which the candidate word belongs as the prediction probability of the candidate word as the $N^{th}$ predicted word; and if the number of the word sets to which the candidate word belongs is at least two, performing an addition operation on the first probability of the candidate word as the $N^{th}$ predicted word in each word set to which the candidate word belongs, and determining the obtained operation result as the prediction probability of the candidate word as the $N^{th}$ predicted word.

In short, in some embodiments, the way of determining that each predicted word is included in the target session message may include two modes, one is the generation mode and the other is the paste mode; and the generation mode refers to selecting the predicted word from the preset word list, and the paste mode refers to determining the predicted word from the historical session messages and the session reference information set.

Based on this and in combination with the above description, it can be seen that the operation of generating each of the predicted words can be summarized as follows: performing deduplication on a plurality of words in a first word set included in a preset word list, a plurality of words in a second word set included in the historical session message and a plurality of words in a third word set included in each piece of reference session information to obtain at least one candidate word; as for any candidate word, if the candidate word only belongs to any one of the first word set, the second word set and the third word set, using the probability of the candidate word as the $N^{th}$ predicted word in the corresponding word set as the prediction probability of the candidate word as the $N^{th}$ predicted word; and if the candidate word belongs to any two or three of the first word set, the second word set and the third word set, adding the probabilities of the candidate word in the plurality of corresponding word sets and using the adding result as the prediction probability of the candidate word as the $N^{th}$ predicted word.

Further, according to the prediction probability corresponding to each of the words, the candidate word with the maximum prediction probability can be selected therefrom as the $N^{th}$ predicted word.

Figure 8:
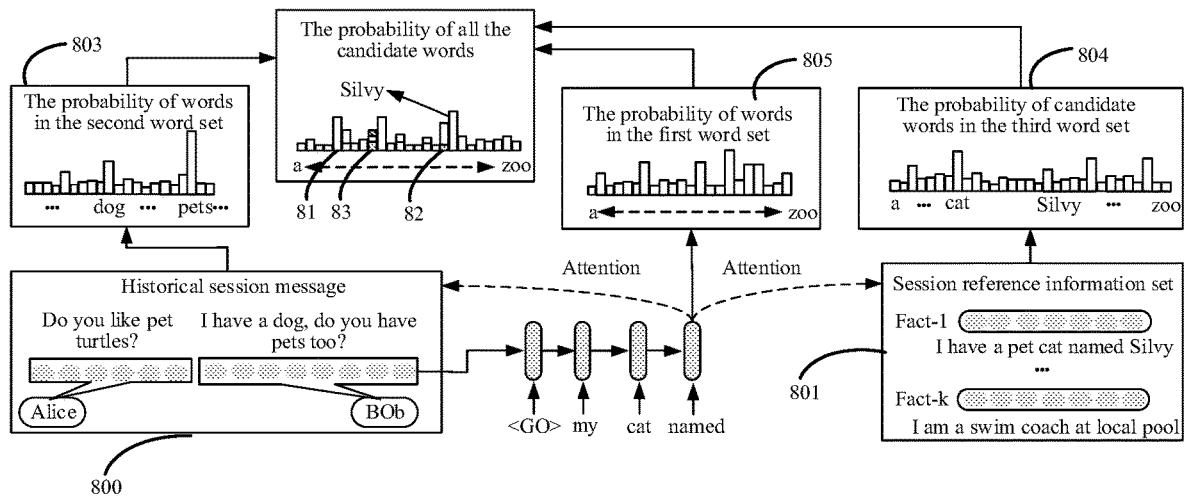
FIG. 8 is a schematic diagram of determining predicted words according to some embodiments.

FIG. 8 is a schematic diagram of determining predicted words according to some embodiments. Assuming that the historical session messages are shown as 800 in FIG. 8, the historical session messages can include a session message "Do you like pet turtles?" inputted by Alice and a session message "I have a dog, do you have pets too?" inputted by Bob; and the reference session information set can be shown as 801 in FIG. 8 and can include k pieces of reference session information, such as "I have a pet named Silvy" and "I am a swim coach at local pool".

Assuming that the predicted words that have been predicted according to the historical session messages and the reference session information set include My cat named, the $4^{th}$ predicted word is to be predicted. At this point, it can be seen that the computer device can compute the probability of each word in the second word list included in the historical session message as the $4^{th}$ predicted word, shown as 803 in FIG. 8, where the probability of each word in the second word list as the $4^{th}$ predicted word is represented as $\gamma \times (1-P_{gen})$, and can compute the probability of each word in the third word list included in the reference session information set as the $4^{th}$ predicted word, shown as 804 in FIG. 8, where the probability of each word in the third word list as the $4^{th}$ predicted word can be represented as $(1-\gamma) \times (1-P_{gen})$; the session message generation device also computes the probability of each word in the first word list included in the preset word list as the $4^{th}$ predicted word, which can be represented as $P_{gen}$; and finally, the words from the three parts are merged, the probabilities of the word in different word lists are merged, and the corresponding prediction probability of generating each word is shown as 805 in FIG. 8.

The word corresponding to the prediction probability indicated by 81 in 805 appears only in the first word set, and the prediction probability of the word is equal to the probability of the word in the first word set. The word corresponding to the prediction probability indicated by 82 appears in the first word set and the third word set, and the prediction probability of the word is equal to the probability of the word in the first word set plus the probability of the word in the third word set. The word corresponding to the prediction probability indicated by 83 appears in the first word set, the second word list and the third word list, and thus the prediction probability of the word is equal to the probability of the word in the first word set plus the probability of the word in the second word set plus the probability of the word in the third word set.

In some embodiments, through the above process performed by the session processing model, it can ensure the accuracy of the determined session role of the session robot and the accuracy of the determined session message corresponding to the session role. In this way, the precision of man-machine dialogue and the user's interest in session can be better improved.

Figure 9:
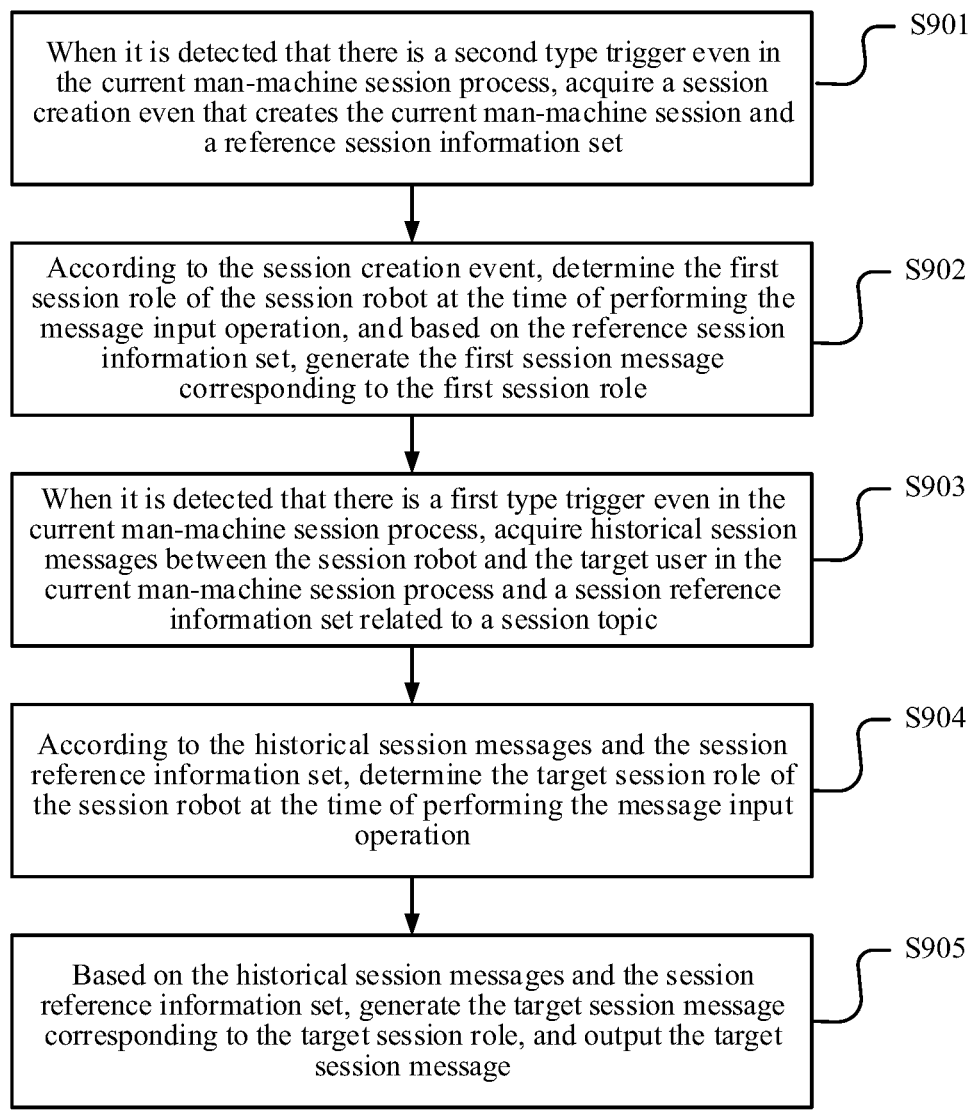
FIG. 9 is a schematic flowchart of yet another session message generation method according to some embodiments.

Based on the above session message generation method, some embodiments provide another session message generation method. FIG. 9 is a schematic flowchart of yet another session message generation method according to some embodiments. The session message generation method as shown in FIG. 9 may be performed by the computer device, and specifically may be performed by the processor of the computer device. The session message generation method as shown in FIG. 9 may include the following operations:

Operation S901, when it is detected that there is a second type trigger event in the current man-machine session process, a session creation event that creates the current man-machine session and a reference session information set are acquired.

In an embodiment, the second type trigger event may refer to the current man-machine session being created. In order to improve the usage experience of the user, when it is detected by the computer device that the current man-machine session is created, the session robot is enabled to immediately perform a message input operation in the current man-machine session process so as to start a session with the target user.

In order to improve the experience of the user and arouse the target user's interest in the current man-machine session, when it is detected that the current man-machine session is created, the first session role of the session robot at the time of performing the message input operation needs to be determined so as to generate the first session message that matches the first session role of the session robot.

Operation S902, according to the session creation event, the first session role of the session robot at the time of performing the message input operation is determined, and based on the session reference information set, the first session message corresponding to the first session role is generated.

In an embodiment, as can be seen from the foregoing, the session creation event may include the target user performing the session creation operation through the session message display device; and alternatively, the session creation event may also include the session message display device detecting that the target user is browsing some specified information, such as browsing information about insomnia symptoms, and browsing some comment information about the movie Drug War.

Some embodiments can determine the first session role of the session robot at the time of performing the message input operation according to the session creation event. In a specific implementation, the computer device may preset the corresponding relationship between the session creation event and the first session role of the session robot; and the first session role corresponding to the session creation event is then found from the preset corresponding relationship.

For example, the session message display device presets that: if the session creation event is the target user performing the session creation operation through the session message display device, the first session role corresponding to the session creation event is a passive session role. It is to be understood that the target user performs the session creation operation through the session message display device, indicating that the target user wants to actively ask the session robot some questions, and at this point, the session robot as a passive session role can send some saying hello session messages or simple greeting session messages to the target user.

If the session creation event is the target user being detected browsing some specified information, the first session role corresponding to the session creation event is an active session role. It is to be understood that the current man-machine session between the target user and the session robot is created as long as it is detected that the target user is browsing some specified information, indicating that the current man-machine session may be actively created by the session robot. At this point, the first session role of the session robot may be an active session role, and the session robot needs to input the session message in an active session role so as to inform the target user of the purpose of creating the current man-machine session, such as informing the user that the current man-machine session can answer the target user with more knowledge about insomnia, or can recommend some movies related to the movie Drug War, to the target user.

Further, after determining the first session role of the session robot, the first session message corresponding to the first session role may be generated based on the session reference information set.

Operation S903, when it is detected that there is a first type trigger event in the current man-machine session process, the historical session messages between the session robot and the target user in the current man-machine session process and the session reference information set related to the session topic are acquired.

Operation S904, according to the historical session messages and the session reference information set, the target session role of the session robot at the time of performing a message input operation is determined.

Operation S905, based on the historical session messages and the session reference information set, a target session message corresponding to the target session role is generated and outputted.

In an embodiment, some feasible implementations included in operation S903 to operation S905 can refer to the description of related operations in the embodiments of FIG. 4 and FIG. 6, which is not described in detail.

In an embodiment, after determining the target session role of the session robot at the time of performing a message input operation according to the historical session messages and the session reference information set, the computer device may also: compare the target session role with the historical session role in which the session robot performs the former message input operation; and if the target session role is different from the historical session role, a session role switching record is generated so as to subsequently verify the accuracy of session role switching according to the session role switching record and optimize the session processing model when it is verified that the accuracy of session role switching is lower than the threshold of accuracy.

In short, if it is detected that the target session role is different from the historical session role, the computer device generates the session role switching record to record that the session role of the session robot has been changed; and the session role switching record includes switching from the historical session role into the target session role. Checking can be subsequently and manually carried out according to the session role switching record in the current man-machine session process to determine the accuracy of session role switching. For example, it is contained in the session role switching record that when the session robot performs a certain message input operation, the session role of the session robot is switched from the active session role into the passive session role, however, during checking, the checker finds that the session bot may still be in the active session role when performing this message input operation and may not be switched into the passive session role.

The accuracy of the session role switching may be used for indicating how many of the plurality of session role switches are correct session role switches. After checking the session role switching record in the whole process of current man-machine session, if it is found that in the current man-machine session process, the accuracy of session role switching is lower than the threshold of accuracy, it indicates that the session processing model is not accurate enough when determining the session role of the session robot, and the session processing model needs to be optimized.

In some embodiments, the accuracy of determining the session role of the session robot can be improved by using different ways to determine the session role of the session robot at the time of performing a message input operation according to different types of trigger events that trigger the session robot to perform the message input operation. In addition, after the session role of the session robot is determined in either way, the session message corresponding to the session role is generated. In this way, the form of man-machine session is enriched, the precision of man-machine interaction is improved, and the user's interest in session can also be improved.

Figure 10:
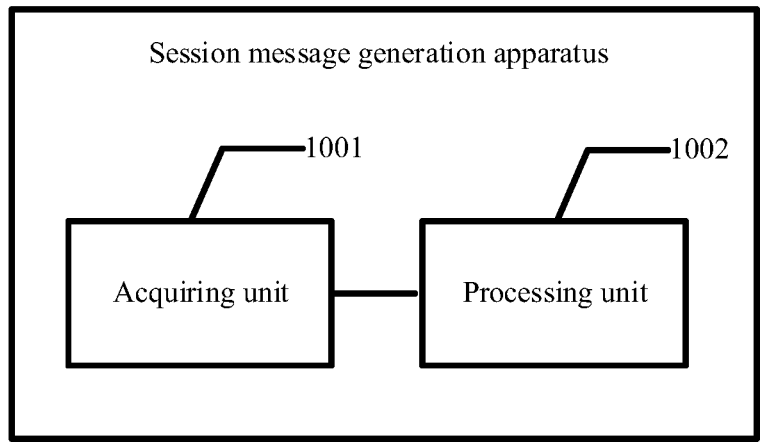
FIG. 10 is a schematic structural diagram of a session message generation apparatus according to some embodiments.

Based on the above embodiment of the session message generation method, some embodiments also provide a session message generation apparatus. FIG. 10 is a schematic structural diagram of a session message generation apparatus according to some embodiments. The session message generation apparatus as shown in FIG. 10 may operate the following units:

an acquiring unit 1001, configured to acquire historical session messages between a session robot and a target user in a current man-machine session process and a session reference information set related to a session topic when it is detected that there is a trigger event in the current man-machine session process, the trigger event being used for triggering the session robot to perform a message input operation in the current man-machine session process; and a processing unit 1002, configured to determine a target session role of the session robot at the time of performing the message input operation according to the historical session messages and the session reference information set, the target session role being an active session role or a passive session role; and the processing unit 1002 being configured to generate a target session message corresponding to the target session role based on the historical session messages and the session reference information set, and to output the target session message.

In an embodiment, the processing unit 1002 may be configured to perform the following operations when determining a target session role of the session robot at the time of performing the message input operation according to the historical session messages and the session reference information set:

determining a role prediction parameter according to the historical session messages and the session reference information set, the role prediction parameter being used for predicting a session role state of the session robot; and determining the session role state of the session robot based on a role state prediction rule and according to the role prediction parameter, and using the session role indicated by the session role state as the target session role of the session robot at the time of performing the message input operation.

In an embodiment, the processing unit 1002 may be configured to perform the following operations when determining the role prediction parameter according to the historical session message set and the session reference information set:

encoding the historical session messages to obtain a first encoding result; setting a corresponding weight value for each piece of session reference information in the session reference information set according to the first encoding result; encoding the corresponding session reference information based on a weight value corresponding to each piece of session reference information in the session reference information set to obtain a second encoding result corresponding to each piece of session reference information; and determining a role prediction parameter based on the second encoding result corresponding to each piece of session reference information and the role prediction parameter determination rule.

In an embodiment, the processor 1002 may be configured to perform the following operations when determining the role prediction parameter based on the second encoding result corresponding to each piece of session reference information and the role prediction parameter determination rule:

determining a first joint context vector based on the second encoding result corresponding to each piece of session reference information; and determining the role prediction parameter based on the role prediction parameter determination rule and according to the first joint context vector.

In an embodiment, the processing unit 1002 may be configured to perform the following operations when generating a target session message corresponding to the target session role based on the historical session messages and the session reference information set:

determining a second joint context vector according to the first encoding result; fusing a first association vector corresponding to the first joint context vector and a second association vector corresponding to the second joint context vector to obtain a fused association vector; concatenating the session role state and the fused association vector; and predicting words based on a vector obtained by concatenation to obtain a plurality of predicted words, and concatenating the plurality of predicted words in a sequence to obtain a target session message.

In an embodiment, the processor 1002 may be configured to perform the following operations when fusing a first association vector corresponding to the first joint context vector and a second association vector corresponding to the second joint context vector to obtain a fused association vector:

using the role prediction parameter as a first reference weight at the time of generating the target session message based on the session reference information set; and based on a reference weight determination rule and according to the second joint context vector, determining a second reference weight at the time of generating the target session message based on the historical session messages; and performing a multiplication operation on the first reference weight and the first association vector to obtain a first operation result; and performing a multiplication operation on the second association vector and the second reference weight to obtain a second operation result; and fusing the first operation result and the second operation result to obtain the fused association vector.

In an embodiment, the processing unit 1002 may be configured to perform the following operations when predicting words based on a vector obtained by concatenation to obtain a plurality of predicted words, and concatenating the plurality of predicted words in a sequence to obtain a target session message:

acquiring at least one candidate word; and acquiring the prediction probability of each of the at least one candidate word as the $N^{th}$ predicted word based on the vector obtained by concatenation, the N being an integer equal to or greater than 1; selecting the candidate word with the maximum prediction probability from the at least one candidate word as the $N^{th}$ predicted word; if a session message obtained by concatenating the former N predicted words in a sequence meets the generation condition of the session message, using the session message obtained by concatenating the former N predicted words in a sequence as the target session message and stopping the above process; and if the session message obtained by concatenating the former N predicted words in a sequence does not meet the generation condition of the session message, performing the N-plus-1 operation and repeating the above process.

In an embodiment, the processing unit 1002 may be configured to perform the following operations when acquiring at least one candidate word:

performing deduplication on a plurality of words in a first word set included in a preset word list, a plurality of words in a second word set included in the historical session message and a plurality of words in a third word set included in each piece of reference session information to obtain a plurality of candidate words.

In an embodiment, the processing unit 1002 may be configured to perform the following operations when acquiring the prediction probability of each of the at least one candidate word as the $N^{th}$ predicted word based on the vector obtained by concatenation:

determining the word set to which any of the at least one candidate word belongs, and based on the concatenated result, determining the first probability of the any candidate word as the $N^{th}$ predicted word in the word set to which the candidate word belongs; and based on the first probability of the any candidate word as the $N^{th}$ predicted word in the word set to which the candidate word belongs, determining the prediction probability of the any candidate word as the $N^{th}$ predicted word.

In an embodiment, the processing unit 1002 may be configured to perform the following operations when determining the prediction probability of the any candidate word as the $N^{th}$ predicted word based on the first probability of the any candidate word as the $N^{th}$ predicted word in the word set to which the candidate word belongs:

if the number of the word set to which the any candidate word belongs is one, determining the first probability of the any candidate word as the $N^{th}$ predicted word in the word set to which the any candidate word belongs as the prediction probability of the any candidate word as the $N^{th}$ predicted word; and if the number of the word sets to which the any candidate word belongs is at least two, performing an addition operation on the first probability of the any candidate word as the Nth predicted word in each word set to which the any candidate word belongs, and determining the obtained operation result as the prediction probability of the any candidate word as the Nth predicted word.

In an embodiment, the determining the target session role of the session robot at the time of performing a message input operation according to the historical session messages and the session reference information set is performed by the processing unit 1002 calling an encoder and a knowledge fusion module included in the session processing model; and the generating a target session message corresponding to the target session role based on the historical session messages and the session reference information set is performed by the processing unit 1002 calling a session message generation model included in the session processing model;

the session processing model is obtained by training based on a sample information set and a target loss function; and the sample information set includes sample historical session messages, a sample session reference information set and supervision session messages corresponding to a preset session robot; and the target loss function includes a first sub loss function, a second sub loss function and a third sub loss function; the first sub loss function is determined based on the supervision session messages and the sample session messages, the sample session messages are generated by the session processing model based on the sample historical session messages and the sample session reference information set and session messages corresponding to a sample session role of the session robot, and the sample session role is obtained by the session processing model by prediction based on the sample historical session messages and the sample session reference information set; the second sub loss function is determined based on the correlation between the supervision session messages and the sample session reference information set; and the third sub loss function is determined based on the session role state corresponding to the sample session role of the session robot.

In an embodiment, the processing unit 1002 is also configured to: compare the target session role with the historical session role in which the session robot performs the former message input operation; and if the target session role is different from the historical session role, a session role switching record is generated so as to subsequently verify the accuracy of the session role switching according to the session role switching record and optimize the session processing model when it is verified that the accuracy of session role switching is lower than the threshold of accuracy.

In an embodiment, the trigger event includes a first type trigger event, which includes any of the following: the target user inputs a session message in the current man-machine session process; and after the session robot finishes inputting the session message in the current man-machine session process, it is not detected that the target user inputs a new session message within a preset time.

In an embodiment, the trigger event also includes a second type trigger event, which refers to detecting that the current man-machine session is created; the processing unit 1002 is also configured to: acquire a session creation event that creates the current man-machine session and the reference session information set, when it is detected that the current man-machine session is created; determine a first session role of the session robot at the time of performing the message input operation according to the session creation event; and generate a first session message corresponding to the first session role based on the reference session information set.

According to some embodiments, the operations involved in the session message generation methods shown in FIG. 4, FIG. 6, and FIG. 9 may be performed by the units of the transmission processing apparatus shown in FIG. 10. For example, the operation S401 described in FIG. 4 may be performed by an acquiring unit 1001 in the session message generation apparatus shown in FIG. 10, and operation S402 and operation S403 may be performed by the processing unit 1002 in the session message generation apparatus shown in FIG. 10. For another example, the operation S601 in the session message generation method shown in FIG. 6 may be performed by the acquiring unit 1001 in the session message generation apparatus shown in FIG. 10, and operation S602 and operation S608 may be performed by the processing unit 1002 in the session message generation apparatus shown in FIG. 10. For yet another example, the operation S901 and operation S903 in the session message generation method shown in FIG. 9 may be performed by the acquiring unit 1001 in the session message generation apparatus shown in FIG. 10; and operation S902, operation S904 and operation S905 may be performed by the processing unit 1002 in the session message generation apparatus shown in FIG. 10.

According to some embodiments, the units of the session message generation apparatus shown in FIG. 10 may be separately or wholly combined into one or several other units, or one (or more) of the units herein may further be divided into a plurality of units of smaller functions. In this way, same operations may be implemented, and the implementation of the technical effects of the embodiments is not affected. The foregoing units are divided based on logical functions. In an actual application, a function of one unit may also be implemented by a plurality of units, or functions of a plurality of units are implemented by one unit. In some embodiments, the session message generation apparatus may also include other units. In an actual application, the functions may also be cooperatively implemented by other units and may be cooperatively implemented by a plurality of units.

According to some embodiments, a computer program (including program code) that can perform the operations in the corresponding method shown in FIG. 4, FIG. 6, and FIG. 9 may be run on a general computing device, such as a computer, which includes processing elements and storage elements such as a central processing unit (CPU), a random access memory (RAM), and a read-only memory (ROM), to construct the session message generation apparatus shown in FIG. 10 and implement the session message generation method in some embodiments. The computer program may be recorded in, for example, a computer-readable storage medium, and may be loaded into the foregoing computing device by using the computer-readable storage medium, and run in the computing device.

In some embodiments, in the process of man-machine session between the session robot and the target user, when it is detected that there is a trigger event in the current man-machine session process, a historical session message set in the current man-machine session and a session reference information set related to a man-machine session topic are acquired, where the trigger event is used for triggering the session robot to perform a message input operation in the current man-machine session process; further, according to the historical session message set and the session reference information set, the target session role of the session robot at the time of performing the message input operation is determined; and then, based on the historical session message set and the session reference information set, a target session message corresponding to the target session role is generated and outputted. As can be seen, in the man-machine session process, the session message that matches the role of the session robot may be generated. Compared with the session form in which the session robot blindly and passively replies to the user's message in the related art, the form of man-machine session is enriched, the precision of man-machine interaction is improved, and the user's interest in session is also improved advantageously.

Figure 11:
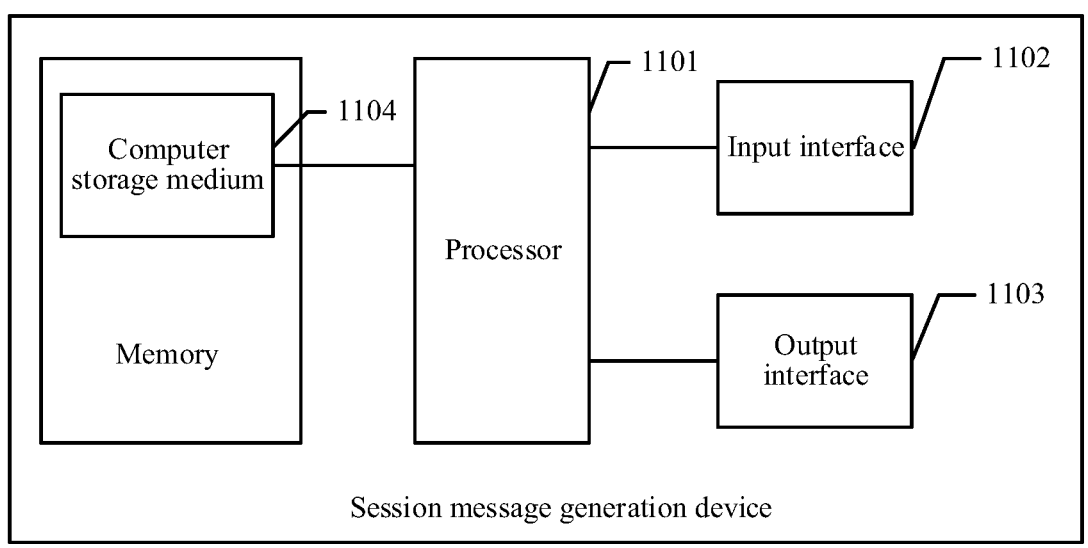
FIG. 11 is a schematic structural diagram of a session message generation device according to some embodiments.

Based on the above embodiments of the method and apparatus, some embodiments provides a session message generation device (i.e., a computer device). FIG. 11 is a schematic structural diagram of a session message device some embodiments some embodiments. The session message generation device shown in FIG. 11 may at least include a processor 1101, an input interface 1102, an output interface 1103 and a computer storage medium 1104. The processor 1101, the input interface 1102, the output interface 1103, and the computer storage medium 1104 may be connected by using a bus or in another manner.

The computer storage medium 1104 may be stored in a memory of the session message generation device. The computer storage medium 1104 is configured to store a computer program. The computer program includes program instructions. The processor 1101 is configured to execute the program instructions stored in the computer storage medium 1104. The processor 1101 (or referred to as a central processing unit (CPU)) is a computing core and a control core of the session message generation device, is suitable for implementing one or more instructions, and is specifically suitable for loading and executing the session message generation method provided in the embodiments.

Some embodiments further provide a non-transitory computer storage medium, and the computer storage medium is a memory device in the session message generation device and is configured to store programs and data. It may be understood that the computer storage medium herein may include an internal storage medium of the session message generation device and certainly may also include an extended storage medium supported by the session message generation device. The computer storage medium provides storage space, and the storage space stores an operating system of the session message generation device. In addition, the storage space further stores one or more instructions suitable to be loaded and executed by the processor 1101. The instructions may be one or more computer programs (including program code). The computer storage medium herein may be a high-speed RAM memory, or may be a non-volatile memory, such as at least one magnetic disk storage. Optionally, the computer storage medium may be at least one computer storage medium far away from the foregoing processor.

In an embodiment, the processor 1101 may load and execute one or more instructions stored in the computer storage medium, to implement corresponding operations of the session message generation method shown in FIG. 4, FIG. 6, and FIG. 9. In specific implementation, the one or more instructions in the computer storage medium are loaded by the processor 1101 to perform the session message generation method provided in the embodiments.

Some embodiments may further provide a computer product or a computer program, the computer product or the computer program including computer instructions, the computer instructions being stored in a computer-readable storage medium. The processor 1101 reads the computer instructions from the computer-readable storage medium, and executes the computer instructions, to cause the computer device to perform the session message generation method shown in FIG. 4, FIG. 6, and FIG. 9.

The foregoing descriptions are merely embodiments of the disclosure and are not intended to limit the protection scope. Any modification, equivalent replacement, or improvement made without departing from the spirit and range of the disclosure shall fall within the protection scope of the disclosure.

What is claimed is:

1. A session message generation method, performed by a computer device, the method comprising:
    displaying, on a display, an prompt window comprising target information to guide a target user to create a man-machine session relating to a session topic;
    creating the man-machine session relating to the session topic based on determining that a session creation operation was performed by the target user;
    acquiring historical session messages between a session robot and the target user in a current man-machine session process and a session reference information set related to the session topic based on a detection of a trigger event in the current man-machine session process,
        wherein the trigger event is used for triggering the session robot to perform a message input operation in the current man-machine session process;
    determining a target session role of the session robot at a time of performing the message input operation based on the historical session messages and the session reference information set,
        wherein the target session role is one of an active session role or a passive session role, and
        wherein the determining the target session role comprises:
            encoding the historical session messages to obtain a first encoding result;
            setting a corresponding weight value for each piece of session reference information in the session reference information set according to the first encoding result;
            encoding the corresponding session reference information based on a weight value corresponding to each piece of session reference information in the session reference information set to obtain a second encoding result corresponding to each piece of session reference information; and
            determining a role prediction parameter based on the second encoding result corresponding to each piece of session reference information and a role prediction parameter determination rule, a first joint vector, and a second joint vector, and
        wherein the role prediction parameter is used for predicting a session role state of the session robot; and
    generating a target session message corresponding to the target session role based on the historical session messages and the session reference information set, and outputting the target session message.

2. The session message generation method according to claim 1, wherein the determining further comprises:
    determining the session role state of the session robot based on a role state prediction rule and according to the role prediction parameter, and using a session role indicated by the session role state as the target session role of the session robot at the time of performing the message input operation.

3. The session message generation method according to claim 1, wherein the determining the role prediction parameter based on the second encoding result comprises:
    determining a first joint context vector based on the second encoding result corresponding to each piece of session reference information; and
    determining the role prediction parameter based on the role prediction parameter determination rule and according to the first joint context vector.

4. The session message generation method according to claim 3, wherein the generating the target session message comprises:
    determining the second joint context vector according to the first encoding result;
    fusing a first association vector corresponding to the first joint context vector and a second association vector corresponding to the second joint context vector to obtain a fused association vector;
    concatenating the session role state and the fused association vector; and
    predicting words based on a vector obtained by concatenation to obtain a plurality of predicted words, and concatenating the plurality of predicted words in a sequence to obtain the target session message.

5. The session message generation method according to claim 4, wherein the fusing the first association vector and the second association vector comprises:
using the role prediction parameter as a first reference weight at the time of generating the target session message based on the session reference information set; and based on a reference weight determination rule and according to the second joint context vector, determining a second reference weight at the time of generating the target session message based on the historical session messages;
performing a multiplication operation on the first reference weight and the first association vector to obtain a first operation result; and performing a multiplication operation on the second association vector and the second reference weight to obtain a second operation result; and
fusing the first operation result and the second operation result to obtain the fused association vector.

6. The session message generation method according to claim 4, wherein the predicting words based on the vector comprises:
acquiring at least one candidate word;
acquiring a prediction probability of each of the at least one candidate word as the Nth predicted word based on the vector obtained by concatenation, the N being an integer equal to or greater than 1;
selecting a candidate word with the maximum prediction probability from the at least one candidate word as the Nth predicted word;
in a case that a session message obtained by concatenating former N predicted words in a sequence meets a generation condition of a session message, using the session message obtained by concatenating the former N predicted words in a sequence as the target session message and stopping the above process; and
in a case that the session message obtained by concatenating the former N predicted words in a sequence does not meet the generation condition of the session message, performing the N-plus-1 operation and repeating the above process.

7. The session message generation method according to claim 6, wherein the acquiring the at least one candidate word comprises:
performing deduplication on a plurality of words in a first word set included in a preset word list, a plurality of words in a second word set included in the historical session messages and a plurality of words in a third word set included in each piece of reference session information to obtain a plurality of candidate words; and
wherein the acquiring the prediction probability of each of the at least one candidate word as the Nth predicted word based on the vector obtained by concatenation includes:
determining a word set to which any of the at least one candidate word belongs, and based on the concatenated result, determining a first probability of the candidate word as the Nth predicted word in the word set to which the any candidate word belongs; and
based on the first probability of the any candidate word as the Nth predicted word in the word set to which the any candidate word belongs, determining a prediction probability of the any candidate word as the Nth predicted word.

8. The session message generation method according to claim 7, wherein the determining the prediction probability comprises:
in a case that the number of the word set to which the any candidate word belongs is one, determining a first probability of the any candidate word as the Nth predicted word in the word set to which the any candidate word belongs as the prediction probability of the any candidate word as the Nth predicted word; and
in a case that the number of the word sets to which the any candidate word belongs is at least two, performing an addition operation on a first probability of the any candidate word as the Nth predicted word in each word set to which the any candidate word belong, and determining the obtained operation result as the prediction probability of the any candidate word as the Nth predicted word.

9. The session message generation method according to claim 1, wherein the determining the target session role of the session robot comprises:
determining the target session role through an encoder and a knowledge fusion module included in a session processing model, according to the historical session messages and the session reference information set; and
wherein the generating the target session message corresponding to the target session role based on the historical session messages and the session reference information set includes:
generating the target session message through a session message generator module included in the session processing model, according to the historical session messages and the session reference information set,
wherein the session processing model is obtained by training based on a sample information set and a target loss function; and the sample information set includes sample historical session messages, a sample session reference information set and supervision session messages corresponding to a preset session robot;
the target loss function includes a first sub loss function, a second sub loss function and a third sub loss function;
the first sub loss function is determined based on the supervision session messages and the sample session messages, the sample session messages are generated by the session processing model based on the sample historical session messages and the sample session reference information set and session messages corresponding to a sample session role of the session robot, and the sample session role is obtained by the session processing model by prediction based on the sample historical session messages and the sample session reference information set;
the second sub loss function is determined based on a correlation between the supervision session messages and the sample session reference information set; and
the third sub loss function is determined based on a session role state corresponding to the sample session role of the session robot.

10. The session message generation method according to claim 9, wherein after the determining the target session role of the session robot, the method further comprises:
comparing the target session role with a historical session role in which the session robot performs a former message input operation; and
in a case that the target session role is different from the historical session role, generating a session role switching record so as to subsequently verify accuracy of session role switching according to the session role switching record and optimize the session processing model when it is verified that the accuracy of session role switching is lower than a threshold of accuracy.

11. The session message generation method according to claim 1, wherein the trigger event includes a first type trigger event, which includes any of the following: the target user inputs a session message in the current man-machine session process; and after the session robot finishes inputting the session message in the current man-machine session process, it is not detected that the target user inputs a new session message within a preset time.

12. The session message generation method according to claim 1, wherein the trigger event further includes a second type trigger event, which refers to detecting that the current man-machine session is created; and the method further comprises:
   acquiring a session creation event that creates the current man-machine session and the reference session information set, when it is detected that the current man-machine session is created;
   determining a first session role of the session robot at the time of performing the message input operation according to the session creation event; and
   generating a first session message corresponding to the first session role based on the reference session information set.

13. A session message generation apparatus, comprising:
   at least one memory configured to store program code; and
   at least one processor configured to read the program code and operate as instructed by the program code, the program code comprising:
   displaying code configured to cause the at least one processor to display, on a display, an advance prompt window comprising guiding information to guide a target user to create a man-machine session relating to a session topic;
   creating code configured to cause the at least one processor to create the man-machine session relating to the session topic based on determining that a session creation operation was performed by the target user;
   acquiring code configured to cause the at least one processor to acquire historical session messages between a session robot and the target user in a current man-machine session process and a session reference information set related to the session topic based on a detection of a trigger event in the current man-machine session process,
      wherein the trigger event is used for triggering the session robot to perform a message input operation in the current man-machine session process;
   processing code configured to cause the at least one processor to determine a target session role of a session robot at the time of performing the message input operation based on the historical session messages and the session reference information set,
      wherein the target session role is one of an active session role or a passive session role,
      wherein the determining the target session role comprises:
         encoding the historical session messages to obtain a first encoding result;
         setting a corresponding weight value for each piece of session reference information in the session reference information set according to the first encoding result;
         encoding the corresponding session reference information based on a weight value corresponding to each piece of session reference information in the session reference information set to obtain a second encoding result corresponding to each piece of session reference information; and
         determining a role prediction parameter based on the second encoding result corresponding to each piece of session reference information and a role prediction parameter determination rule, a first joint vector, and a second joint vector, and
      wherein the role prediction parameter is used for predicting a session role state of the session robot; and
   generating code configured to cause the at least one processor to generate a target session message corresponding to the target session role based on the historical session messages and the session reference information set and to output the target session message.

14. The session message generation apparatus according to claim 13, wherein the processing code is further configured to cause the at least one processor to:
   determine the session role state of the session robot based on a role state prediction rule and according to the role prediction parameter, and use a session role indicated by the session role state as the target session role of the session robot at the time of performing the message input operation.

15. The session message generation apparatus according to claim 13, wherein the determining the role prediction parameter based on the second encoding result comprises:
   determining a first joint context vector based on the second encoding result corresponding to each piece of session reference information; and
   determining the role prediction parameter based on the role prediction parameter determination rule and according to the first joint context vector.

16. The session message generation apparatus according to claim 15, wherein the processing code is further configured to cause the at least one processor to:
   determine the second joint context vector according to the first encoding result;
   fuse a first association vector corresponding to the first joint context vector and a second association vector corresponding to the second joint context vector to obtain a fused association vector;
   concatenate the session role state and the fused association vector; and
   predict words based on a vector obtained by concatenation to obtain a plurality of predicted words, and concatenate the plurality of predicted words in a sequence to obtain the target session message.

17. The session message generation apparatus according to claim 16, wherein the fuse the first association vector and the second association vector comprises:
   using the role prediction parameter as a first reference weight at the time of generating the target session message based on the session reference information set; and based on a reference weight determination rule and according to the second joint context vector, determining a second reference weight at the time of generating the target session message based on the historical session messages;
   performing a multiplication operation on the first reference weight and the first association vector to obtain a first operation result; and performing a multiplication operation on the second association vector and the second reference weight to obtain a second operation result; and fusing the first operation result and the second operation result to obtain the fused association vector.

18. A non-transitory computer-readable storage medium, storing computer program that when executed by at least one processor causes the at least one processor to:

display, on a display, an advance prompt window comprising guiding information to guide a target user to create a man-machine session relating to a session topic;

create the man-machine session relating to the session topic based on determining that a session creation operation was performed by the target user;

acquire historical session messages between a session robot and the target user in a current man-machine session process and a session reference information set related to the session topic based on a detection of a trigger event in the current man-machine session process, wherein the trigger event is used for triggering the session robot to perform a message input operation in the current man-machine session process;

determine a target session role of the session robot at a time of performing the message input operation based on the historical session messages and the session reference information set, wherein the target session role is one of an active session role or a passive session role, wherein the determining the target session role comprises:

encoding the historical session messages to obtain a first encoding result;

setting a corresponding weight value for each piece of session reference information in the session reference information set according to the first encoding result;

encoding the corresponding session reference information based on a weight value corresponding to each piece of session reference information in the session reference information set to obtain a second encoding result corresponding to each piece of session reference information; and determining a role prediction parameter based on the second encoding result corresponding to each piece of session reference information and a role prediction parameter determination rule, a first joint vector, and a second joint vector, and wherein the role prediction parameter is used for predicting a session role state of the session robot; and generate a target session message corresponding to the target session role based on the historical session messages and the session reference information set, and outputting the target session message.

* * * * *